(12) United States Patent
Sumida et al.

(10) Patent No.: US 9,422,374 B2
(45) Date of Patent: Aug. 23, 2016

(54) CONTINUOUS POLYMERIZATION DEVICE AND METHOD FOR PRODUCING POLYMER COMPOSITION

(71) Applicant: SUMITOMO CHEMICAL COMPANY, LIMITED, Tokyo (JP)

(72) Inventors: Masakazu Sumida, Ehime (JP); Kazuhiro Yamazaki, Ehime (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/764,908

(22) PCT Filed: Jan. 15, 2014

(86) PCT No.: PCT/JP2014/051158
§ 371 (c)(1),
(2) Date: Jul. 30, 2015

(87) PCT Pub. No.: WO2014/119431
PCT Pub. Date: Aug. 7, 2014

(65) Prior Publication Data
US 2015/0368374 A1 Dec. 24, 2015

(30) Foreign Application Priority Data

Jan. 31, 2013 (JP) ................................ 2013-016990

(51) Int. Cl.
*C08F 2/01* (2006.01)
*C08F 2/02* (2006.01)
(Continued)

(52) U.S. Cl.
CPC ............... *C08F 2/01* (2013.01); *B01J 19/0013* (2013.01); *B01J 19/1862* (2013.01);
(Continued)

(58) Field of Classification Search
CPC .................... C08F 2/01; B01J 19/1862; B01J 2219/00103; B01J 19/0013; B01J 2219/0058
USPC ............................................................ 526/65
See application file for complete search history.

(56) References Cited

U.S. PATENT DOCUMENTS 3,875,128 A * 4/1975 Suzuki .................. B01J 3/04
526/352
4,271,280 A * 6/1981 Tomura .................. B01J 3/04
526/352.2
(Continued)

FOREIGN PATENT DOCUMENTS

CN 1040801 A 3/1990
CN 102558396 A 5/2012
(Continued)

OTHER PUBLICATIONS

Stamixco Heat Exchanger Product Bulletin HE-1.0 (2007).*
(Continued)

*Primary Examiner* — Fred M Teskin
(74) *Attorney, Agent, or Firm* — Rothwell, Figg, Ernst & Manbeck, P.C.

(57) ABSTRACT

A continuous polymerization apparatus uses at least a first reactor and a second reactor (10, 20). Each of the reactors (10, 20) includes at least one supply port (11a, 21a, and 21b), an effluent port (11b, 21d), and a temperature detecting means ($T_1$, $T_2$), each of which detects the temperature in the reactor. The supply port (11a) of the first reactor (10) is connected to supply sources (1, 3) of a raw material monomer and a polymerization initiator, and the effluent port (11b) is connected to the first supply port (21a) of the second reactor (20) through a connection line (15a). The second supply port (21b) of the second reactor (20) is connected to a replenishing line (15b) that supplies a new raw material monomer to the second reactor.

10 Claims, 3 Drawing Sheets

(51) Int. Cl.
*B01J 19/18* (2006.01)
*C08F 2/00* (2006.01)
*B01J 19/00* (2006.01)
B01J 19/24 (2006.01)
C08F 20/14 (2006.01)

(52) U.S. Cl.
CPC .............. *B01J 19/245* (2013.01); *C08F 2/001* (2013.01); *B01J 2219/00058* (2013.01); *B01J 2219/00103* (2013.01); *B01J 2219/24* (2013.01)

(56) References Cited

U.S. PATENT DOCUMENTS

| | | | |
|---|---|---|---|
| 4,728,701 | A | 3/1988 | Jarvis |
| 4,933,400 | A | 6/1990 | Jarvis |
| 5,728,793 | A | 3/1998 | Kumagai et al. |
| 5,804,676 | A | 9/1998 | Hieda et al. |
| 6,214,942 | B1 * | 4/2001 | Siol .......................... C08F 6/005 526/328 |
| 6,632,907 | B1 * | 10/2003 | Mizota ................. B01J 19/0053 526/258 |
| 7,220,048 | B2 * | 5/2007 | Kohlgruber ............... B01F 3/10 165/172 |
| 2006/0089474 | A1 | 4/2006 | Yamazaki et al. |
| 2013/0041117 | A1 | 2/2013 | Hayashida et al. |
| 2014/0329981 | A1 | 11/2014 | Sato et al. |

FOREIGN PATENT DOCUMENTS

| | | |
|---|---|---|
| CN | 102702399 A | 8/2012 |
| CN | 102844335 A | 2/2013 |
| EP | 2450101 A1 | 5/2012 |
| EP | 2 481 477 A1 | 8/2012 |
| EP | 2481476 A1 | 8/2012 |
| EP | 2 500 363 A1 | 9/2012 |
| EP | 2500363 A1 * | 9/2012 |
| GB | 2284425 A | 6/1995 |
| JP | 01172401 A | 7/1987 |
| JP | 05331212 A | 12/1993 |
| JP | 2000-53712 A | 2/2000 |
| JP | 2000-506918 A | 6/2000 |
| JP | 2004211105 A | 7/2004 |
| JP | 2000-26507 A | 1/2006 |
| JP | 2006104282 A | 4/2006 |
| JP | 07126308 A | 5/2007 |
| JP | 2010-001511 A | 1/2010 |
| JP | 100001511 A | 1/2010 |
| JP | 2012102190 A | 5/2012 |
| JP | 2012-153805 A | 8/2012 |
| JP | 2012153807 A | 8/2012 |
| JP | 2012-207203 A | 10/2012 |
| JP | 2013-127048 A | 6/2013 |
| JP | 2013194191 A | 9/2013 |
| KR | 100689598 B1 | 2/2007 |
| WO | 2011125980 A1 | 10/2011 |
| WO | 2013141026 A1 | 9/2013 |

OTHER PUBLICATIONS

International Preliminary Report on Patentability mailed on Aug. 4, 2015 in corresponding Japanese Application No. 2014-051158, 12 pages.
Chinese Office Action and English translation dated May 23, 2016, CN Patent Application No. 201480011516, 25 pages.
Japanese Office Action (partial translation) dated May 10, 2016, JP Patent Application No. 236118, 5 pages.
Partial Translation of Japanese Office Action, Notification of Reason(s) for Rejection dated May 10, 2016, JP Application No. 2013-016990, 4 pages.

* cited by examiner

CONTINUOUS POLYMERIZATION DEVICE AND METHOD FOR PRODUCING POLYMER COMPOSITION

CROSS-REFERENCE TO RELATED APPLICATION

The present application is a national stage filing under 35 U.S.C. §371 of International Application No. PCT/JP2014/051158, filed on 15 Jan. 2014. The present application also claims priority under 35 U.S.C. §119 to Japanese Patent Application No. 2013-016990 filed on 31 Jan. 2013.

TECHNICAL FIELD

The present invention relates to a continuous polymerization apparatus, that is, an apparatus to continuously conduct a polymerization. The present invention also relates to a production method of a polymer composition that is conducted by using of such a continuous polymerization apparatus.

BACKGROUND ART

A resin composition such as a methacrylic ester polymer is produced by continuous polymerization according to which a raw material monomer, a polymerization initiator, etc., are continuously supplied to a reactor to be polymerized. A continuous solution polymerization method using a solvent (or a dispersion medium, that will also apply hereinafter) to conduct a continuous polymerization, and a continuous bulk polymerization method using no solvent to conduct a continuous polymerization are known as the continuous polymerization methods.

Generally, the continuous solution polymerization method has low productivity because of the use of a solvent, and is not efficient. In contrast, the continuous bulk polymerization method has an advantage of being able to efficiently produce a polymer composition because the polymerization reaction is conducted without using any solvent. The continuous bulk polymerization method, however, practically has various problems compared to the continuous solution polymerization method, such as that reaction control is difficult due to high viscosity of a reaction mixture, and that, when an inner face of a reactor is cooled to remove heat from the reaction system, this degrades the quality of the polymer composition and, as a result, the quality of a resin composition obtained therefrom. A method has therefore been proposed according to which, using a reactor of a complete mixing type, the reactor is fully filled with a liquid to exclude any gas phase part therefrom and continuous bulk polymerization is conducted under an adiabatic condition with no heat transfer to and from the outside (Patent Document 1). Moreover, to secure such an adiabatic condition, a continuous polymerization apparatus has been proposed that controls a supply amount of a raw material monomer and a supply amount of a polymerization initiator such that the temperature in the reactor is caused to be equal to a set temperature of an outer wall face of the reactor (Patent Document 2).

PRIOR ART DOCUMENT

Patent Document

Patent Document 1: Japanese Laid-Open Patent Publication No. 07-126308
Patent Document 2: Japanese Laid-Open Patent Publication No. 2006-104282
Patent Document 3: Japanese Laid-Open Patent Publication No. 01-172401
Patent Document 4: Japanese Laid-Open Patent Publication No. 05-331212
Patent Document 5: Japanese Laid-Open Patent Publication No. 2004-211105

SUMMARY OF INVENTION

Problems to be Solved by the Invention

Recently, uses of resin compositions such as a methacrylic ester polymer have further been expanded, and the demand is growing for more efficient production of a high quality polymer composition (for example, a polymer composition excellent in physical properties such as heat resistance and thermal stability, and having less impurities mixed therein). It has however turned out that the conventional continuous polymerization apparatuses (Patent Documents 1 and 2) do not always sufficiently work to meet the demand.

An object of the present invention is to provide a novel continuous polymerization apparatus, and to provide a production method of a polymer composition that can be conducted by using of the continuous polymerization apparatus and according to which a polymer composition suitable for obtaining a high quality resin composition can more efficiently be produced.

Means for Solving Problems

The inventors considered using at least two reactors (desirably, complete mixing type reactors) in combination to conduct the continuous polymerization. As to the continuous solution polymerization method, an apparatus is known according to which reactors are set to be in two stages, the most part of the polymerization is conducted in the pre-stage reactor, and the polymerization is completed and the polymerization initiator, etc., are removed in the post-stage reactor (Patent Document 3), and another apparatus is known according to which the polymerization is conducted to some extent in the pre-stave reactor and a solvent is added thereto in the post-stage reactor to conduct the polymerization (Patent Document 4). In these apparatuses, however, removal of the heat from the reaction system is conducted by reflux cooling (the raw material monomer, etc., in the reactor are evaporated and taken out of the reactor, and the monomer, etc., are returned again into the reactor after undergoing cold condensation). Especially, when the polymerization is conducted under conditions with a less amount of solvent or at a high polymerization conversion to increase the productivity, the viscosity of the mixture in the reaction system becomes high, this causes local or rapid cooling of the reaction system to tend to occur, and this causes the adhesion and growth of a gel to be remarkable on the inner wall face of the reactor. As a result, a problem arises such as that gelled substance is immixed into an obtained polymer composition as an impurity. As to the continuous solution polymerization method, a method has also been proposed according to which reactors set to be in two stages are used and an average residence time in each of these reactors is set to be within a predetermined range relative to a half-life of the polymerization initiator (Patent Document 5). With such an apparatus used in this method, however, removal of heat from the reaction system is conducted by using of a jacket provided on an outer wall face of the reactors. Especially, when the polymerization is conducted under conditions with a less amount of solvent or at a high polymerization conversion to increase the productivity, the local or rapid cooling by using the jacket provided on the outer wall face of the second reactor is necessary for maintaining the polymerization temperatures in the first reactor and the second reactor at the same temperature to increase a polymerization conversion in the second reactor, and this causes the gel to adhere to and grow on the inner wall face of the reactor. The problem that the gelled substance is immixed into the polymer composition as an impurity cannot therefore be solved, and quality of the obtained resin composition is not always sufficiently excellent.

The inventors have actively studied the problem and have found that a high quality resin composition, especially, a methacrylic ester polymer can efficiently be produced by forming an intermediate composition by continuously polymerizing a raw material monomer in the presence of a polymerization initiator in a first reactor, thereafter, continuously supplying the intermediate composition into a second reactor, and separately supplying a new (additional) raw material monomer into the second reactor to conduct the continuous polymerization reaction. The inventors thereby completed the present invention.

The present invention can therefore present the following items [1] to [13].

[1] A continuous polymerization apparatus comprising at least a first reactor and a second reactor, wherein
each of the reactors comprises at least one supply port, an effluent port, and a temperature detecting means that detects a temperature in the reactor, wherein
the supply port of the first reactor is connected to supply sources of a raw material monomer and a polymerization initiator, wherein
the effluent port of the first reactor is connected to a first supply port of the second reactor by a connection line, and wherein
a second supply port of the second reactor is connected to a replenishing line that supplies a new raw material monomer to the second reactor.

[2] The continuous polymerization apparatus of item [1], wherein the replenishing line is connected to a supply source of a new raw material monomer, and wherein at least one of the supply source and the replenishing line comprises a temperature regulating means.

[3] The continuous polymerization apparatus of item [1] or [2], wherein the connection line comprises a cooling means.

[4] The continuous polymerization apparatus of any one of items [1] to [3], wherein the connection line comprises a mixing means between the effluent port of the first reactor and a first supply port of the second reactor.

[5] The continuous polymerization apparatus of any one of items [1] to [4], wherein each of the reactors is a tank type reactor, and wherein the effluent port of each of the reactors is located at a top of the reactor.

[6] The continuous polymerization apparatus of any one of items [1] to [5], wherein each of the reactors is a complete mixing type reactor.

[7] The continuous polymerization apparatus of any one of items [1] to [6], wherein the first or the second supply port of the second reactor or a third supply port provided on the second reactor is connected to a supply source of a new polymerization initiator.

[8] The continuous polymerization apparatus of any one of items [1] to [7], wherein the first and the second reactors are used to conduct a continuous bulk polymerization, respectively.

[9] A production method of a polymer composition using the continuous polymerization apparatus of any one of items [1] to [8], wherein the production method comprises:
a first polymerization step of continuously supplying the raw material monomer and the polymerization initiator from the supply sources of the raw material monomer and the polymerization initiator to the first reactor through the supply port of the first reactor to subject the raw material monomer and the polymerization initiator to a continuous polymerization in the first reactor, and continuously taking out an intermediate composition obtained thereby from the effluent port of the first reactor, and
a second polymerization step of continuously supplying the intermediate composition to the second reactor through the first supply port of the second reactor, and supplying the new raw material monomer to the second reactor from the replenishing line connected to the second supply port of the second reactor for the intermediate composition and the new raw material to further be subjected to a continuous polymerization in the second reactor for the polymer composition obtained thereby to be continuously taken out from the effluent port of the second reactor.

[10] The production method of a polymer composition of item [9], wherein a ratio of flow rate of the intermediate composition taken out from the effluent port of the first reactor to the connection line to flow rate of the new raw material monomer supplied from the replenishing line to the second reactor is within a range from 0.995:0.005 to 0.5:0.5.

[11] The production method of a polymer composition of item [9] or [10], wherein a temperature of the new raw material monomer supplied from the replenishing line to the second reactor is within a range from −40 to 30° C.

[12] The production method of a polymer composition of any one of items [9] to [11], wherein a temperature in the first reactor detected by the temperature detecting means of the first reactor and a temperature in the second reactor detected by the temperature detecting means of the second reactor are within a range from 120 to 150° C., respectively.

[13] A molded article obtained from the polymer composition obtained by using of the production method of any one of items [9] to [12].

Effects of the Invention

According to the present invention, the novel continuous polymerization apparatus is provided. According to the present invention, the production method of a polymer composition is also provided that can be conducted using the continuous polymerization apparatus, and that can more efficiently produce the polymer composition suitable for obtaining a high quality resin composition (especially, a methacrylic ester polymer).

DESCRIPTION OF EMBODIMENTS

A continuous polymerization apparatus of the present invention includes at least two reactors, and continuous polymerization such as, for example, either continuous bulk polymerization or continuous solution polymerization can be conducted in each of the reactors. The continuous polymerization apparatus of the present invention is understood as a continuous bulk polymerization apparatus when continuous bulk polymerization is conducted in all of the reactors, and is understood as a continuous solution polymerization apparatus when continuous solution polymerization is conducted in all of the reactors. The continuous polymerization apparatus of the present invention is, however, not limited to the above, and may be the one according to which continuous bulk polymerization is conducted in a reactor (for example, at least one pre-stage reactor) and continuous solution polymerization is conducted in another reactor (for example, at least one reactor in a further post-stage).

Figure 1:
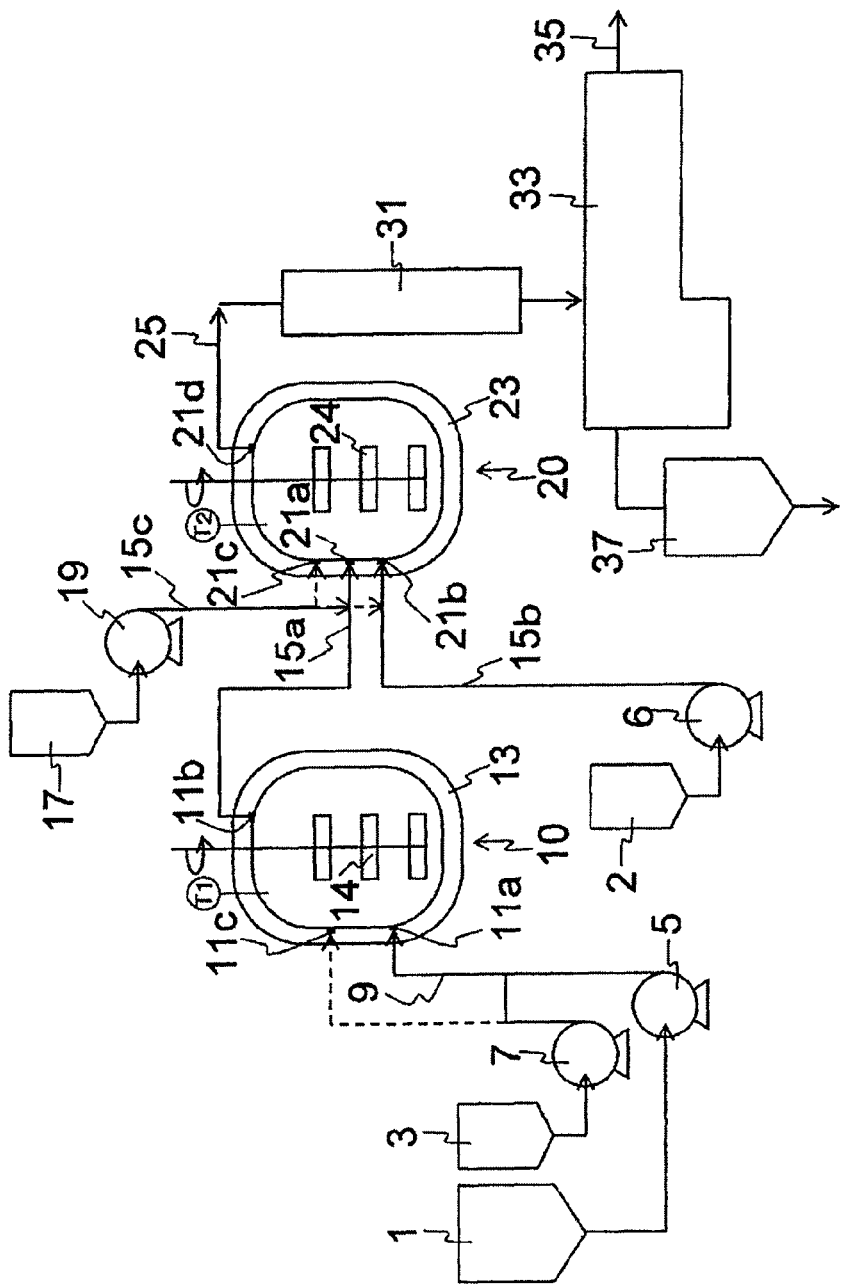
FIG. 1 is a schematic view of a continuous polymerization apparatus in one embodiment according to the present invention.

One embodiment of the present invention will be described below in detail with reference to FIGS. 1 to 3.

A continuous polymerization apparatus in this embodiment includes, at least, a first reactor 10 and a second reactor 20. These reactors 10 and 20 are not especially limited only when the reactors can each conduct a continuous polymerization such as continuous bulk polymerization and continuous solution polymerization, and, for example, may each be a tank-type reactor or a pipe-type reactor, are, preferably, each a (continuous) tank-type reactor, and, are, more preferably, each a complete mixing-type (continuous) tank-type reactor. Yet more preferably, the reactors 10 and 20 are both complete mixing-type reactors, are, preferably, both complete mixing-type (continuous) tank-type reactors, and, are, especially preferably, are each used to conduct the continuous bulk polymerization in this embodiment. The reactor 10 and the reactor 20 used in this embodiment are each not limited to the complete mixing-type reactor used to conduct the continuous bulk polymerization. Hereinafter, though the complete mixing-type reactor will be described in the embodiment of the present invention, the reactors used in the present invention are not limited to the complete mixing-type reactors.

For example, the first reactor 10 includes, at least, a supply port 11a and an effluent port 11b, and, preferably, may further include a jacket 13 as a temperature regulating means to regulate the temperature of an outer wall face of the reactor and a stirrer 14 to stir the content thereof. Similarly, the second reactor 20 includes, at least, a first supply port 21a, a second supply port 21b, and an effluent port 21d and, preferably, may further include a jacket 23 surrounding an outer wall face of the reactor as a temperature regulating means to regulate the temperature of the outer wall face of the reactor, and a stirrer 24 to stir the content thereof. Though, preferably, the effluent ports 11b and 21d are each provided to be located at a top of the reactor in this embodiment, the locations of the effluent ports are not limited to the above. On the other hand, though the supply port 11a and the supply ports 21a and 21b do not limit this embodiment, these supply ports may generally be disposed each at an arbitrary proper position in the lower portion of each of the reactors. Moreover, these reactors 10 and 20 respectively include temperature sensors ($T_1$, $T_2$) each as a temperature detecting means to detect a temperature in the reactor. The position of each of the temperature sensors ($T_1$, $T_2$) is not especially limited only when the temperature sensors can each detect at that position the temperature of the reacting mixture in the reactor and, preferably, the temperature sensors are each provided at the top of the reactor.

The first reactor 10 and the second reactor 20 may each have an inner volume that may be same as or different from that of each other. The average residence time can be caused to effectively be different between the first reactor 10 and the second reactor 20 by causing the inner volume of the first reactor 10 and the inner volume of the second reactor 20 to be different from each other.

Preferably, the stirrers 14 and 24 are each a stirrer to cause the condition of the inside of the reactor to substantially be a complete mixed condition. These stirrers may each include an arbitrary proper stirring blade(s), and, for example, may each include a MIG impeller(s), a MAXBLEND impeller(s) (registered trademark, manufactured by Sumitomo Heavy Industries, Ltd.), a paddle impeller(s), a double helical ribbon impeller(s), a FULLZONE impeller(s) (registered trademark, manufactured by Kobelco Eco-Solutions Co., Ltd.), etc. Desirably, a baffle is attached inside the reactor to enhance the stirring effect in the reactor. This embodiment is, however, not limited to the above, and may include arbitrary proper configurations instead of the stirrers 14 and 24 as long as mixing can be executed or, preferably, the complete mixed condition can substantially be established in each of the reactor.

Though the reactors 10 and 20 generally are more advantageous when the reactors 10 and 20 each have higher stirring efficiency, it is advantageous that power of stirring does not exceed the necessary level thereof from the viewpoint of adding no excessive heat to the inside of each of the reactors by the stirring operation. Though the power of stirring is not especially limited, the power is, preferably, 0.5 to 30 kW/m$^3$, is, more preferably, 0.5 to 20 kW/m$^3$, and, is, yet more preferably, 1 to 15 kW/m$^3$. Preferably, the power of stirring is set at a larger level as the viscosity of the reaction system becomes higher (or a content proportion of the polymer in the reaction system becomes higher).

As depicted, the supply port 11a of the first reactor 10 is connected, through a raw material supply line 9, to a raw material monomer tank (a supply source of the raw material monomer) 1 and a polymerization initiator tank (a supply source of a polymerization initiator and, when necessary, a raw material monomer) 3 respectively through pumps 5 and 7. Though the supply sources of the raw material monomer and the polymerization initiator to the first reactor 10 respectively are the raw material monomer tank 1 and the polymerization initiator tank 3 in this embodiment, the number of the supply sources of the raw material monomer and the polymerization initiator, the form of the raw material monomer and the polymerization initiator (in the case of a mixture, for example, a composition thereof), etc., are not especially limited as long as the raw material monomer and the polymerization initiator can properly be supplied to the first reactor 10. Though not essentially to this embodiment, another supply port 11c may be provided on the first reactor 10, and this supply port 11c may be connected to the polymerization initiator tank 3, for example, through the pump 7, as indicated by a dotted line in FIG. 1. In this case, the supply from the polymerization initiator tank 3 to the supply port 11a may or may not be discontinued. The effluent port 11b of the first reactor 10 may be connected to the first supply port 21a of the second reactor 20 through a connection line 15a. The effluent port 21d of the second reactor 20 is connected to an effluent line 25. The first reactor 10 and the second reactor 20 can thereby be connected to each other in series. Though a pump may or no pump may be present in the connection line 15a between the effluent port 11b of the first reactor 10 and the first supply port 21a of the second reactor 20, preferably, no pump is present between them.

The present invention is characterized in that the connection line 15a is connected from the effluent port 11b of the first reactor 10 to the first supply port 21a of the second reactor 20 while a replenishing line 15b capable of newly supplying a raw material monomer (and, when necessary, other component(s) such as a chain transfer agent) to the second reactor 20 is separately connected to the second supply port 21b provided at an arbitrary position of the second reactor 20. The position of the second supply port 21b is not especially limited, and may be under the first supply port 21a of the second reactor 20, may be at the same height as that of the first supply port 21a, or may be above the first supply port 21a. The conditions such as the temperature, the amount to be supplied, etc., of the raw material monomer to newly be supplied to the reactor 20 can separately be controlled in more detail by separately and newly supplying the raw material monomer from the second supply port 21b provided on the second reactor 20 to the inside of the second reactor 20. A polymer composition suitable for obtaining a high quality resin composition can therefore be more efficiently produced. Especially, the polymerization reaction in the second reactor 20 can be controlled desirably at a low temperature by regulating, preferably, by cooling, the temperature of the raw material monomer supplied to the second reactor 20, and a high quality resin composition, especially, a polymer composition suitable for obtaining a high quality methacrylic ester polymer can more efficiently be produced.

The replenishing line 15b acts to newly supply separately the raw material monomer to the second reactor 20, and may be connected to a raw material monomer tank (a supply source of the raw material monomer and, when necessary, other component(s) such as the chain transfer agent) 2 that is newly provided separately, through a pump 6. Though the supply source of the new raw material monomer (and, when necessary, other component(s) such as the chain transfer agent) to the second reactor 20 is the separately provided raw material monomer tank 2 in this embodiment, the number of the supply sources of the raw material monomer and the form of the raw material monomer (in the case of a mixture, for example, a composition thereof), etc., are not especially limited as long as the new raw material monomer can properly be supplied from the replenishing line 15b to the second reactor 20. In the present invention, the raw material monomer contained in the raw material monomer tank (the supply source of the raw material monomer) 2 may be same as or different from the raw material monomer contained in the raw material monomer tank (the supply source of the raw material monomer) 1. Based on the above configuration, the new raw material monomer can be supplied from the replenishing line 15b to the second reactor 20 corresponding to the temperature, etc., of the first reactor 10 and/or the second reactor 20. Because the first reactor 10 includes the temperature sensor $T_1$ as the temperature detecting means to detect the temperature in the first reactor 10 as described above, the temperature in the replenishing line 15b in the vicinity of the second supply port 21b of the second reactor 20, especially, the temperature of the raw material monomer supplied to the second reactor 20 may be controlled to be lower than the temperature in the first reactor 10 detected by the temperature sensor $T_1$ (for example, in a temperature range set in advance). In this case, the raw material monomer tank 2 and/or the replenishing line 15b may properly include, when necessary, a temperature regulating means such as a heating means, a cooling means, a heat retaining means, or a heat insulating means.

In the present invention, preferably, the cooling means is provided as the temperature regulating means on the raw material monomer tank 2 and/or the replenishing line 15b, and, preferably, the raw material monomer (and, when necessary, other component(s) such as the chain transfer agent) is thereby cooled to a temperature of, for example, within a range from −40 to 30° C., and, preferably, within a range from −40 to 10° C., and the raw material monomer is supplied from the second supply port 21b of the second reactor 20 into the second reactor 20. The polymerization reaction can take place at a low temperature in the second reactor 20 by cooling and supplying the raw material monomer to the second reactor 20. The syndiotacticity of the formed polymer (a polymer) is thereby improved, and the heat resistance of the obtained polymer composition is improved. Formation of any by-product is suppressed in the second reactor 20 by separately cooling and supplying the raw material monomer into the second reactor 20 as above. The purity and the polymerization degree of the obtained polymer composition are thereby improved, and the thermal stability and the heat resistance thereof are improved.

Though not essential to the present invention, preferably, the second reactor 20 is connected to a polymerization initiator tank (a supply source of a new polymerization initiator and, when necessary, a raw material monomer) 17 through a pump 19. Though the supply sources of the new polymerization initiator is the polymerization initiator tank 17 in this embodiment, the number of the supply sources of the new polymerization initiator, the form of the polymerization initiator (in the case of a mixture, for example, a composition thereof), etc., are not especially limited as long as the new polymerization initiator can properly be supplied to the second reactor 20. When the polymerization initiator tank 17 and the pump 19 are present, the first supply port 21a of the second reactor 20 may be connected to the polymerization initiator tank 17 through the pump 19 at an arbitrary point of the connection line 15a as depicted in FIG. 1, or a third supply port 21c may be provided on the second reactor 20, and the third supply port 21c may be connected to the polymerization initiator tank 17 through the pump 19 as indicated by, for example, a dotted line in FIG. 1. In this case, the supply from the polymerization initiator tank 17 to the connection line 15a (and the first supply port 21a) may or may not be discontinued. As indicated by the dotted line in FIG. 1, the polymerization initiator tank 17 may be connected to the replenishing line 15b at an arbitrary position thereof through the pump 19. In this case, the supply from the polymerization initiator tank 17 to the connection line 15a (and the first supply port 21a) may or may not be discontinued.

The pumps 5 to 7, and the pump 19 when the pump 19 is present, are each not especially limited, and, preferably, are pumps capable of setting the flow rates from the raw material monomer tanks 1 and 2 and the polymerization initiator tank 3, and a flow rate from the polymerization initiator tank 17 when the polymerization initiator tank 17 is present, to be at constant values. Preferably, for example, these pumps can be multiple reciprocating pumps, and can be, more preferably, pulsation-free controlled-volume pumps such as duplicate pulsation-free controlled-volume pumps and triplex pulsation-free controlled-volume pumps. The supply amounts can be controlled by using of these pumps, as the supply amounts (or each a supply flow rate, that also applies hereinafter) of the raw material monomer and the polymerization initiator to the first reactor 10, the supply amount of the new raw material monomer (and, when necessary, the supply amount(s) of the other component(s) such as the chain transfer agent) to the replenishing line 15b, and, when necessary, an additional supply amount of the polymerization initiator (or the raw material monomer and the polymerization initiator) to the second reactor 20.

Figure 2:
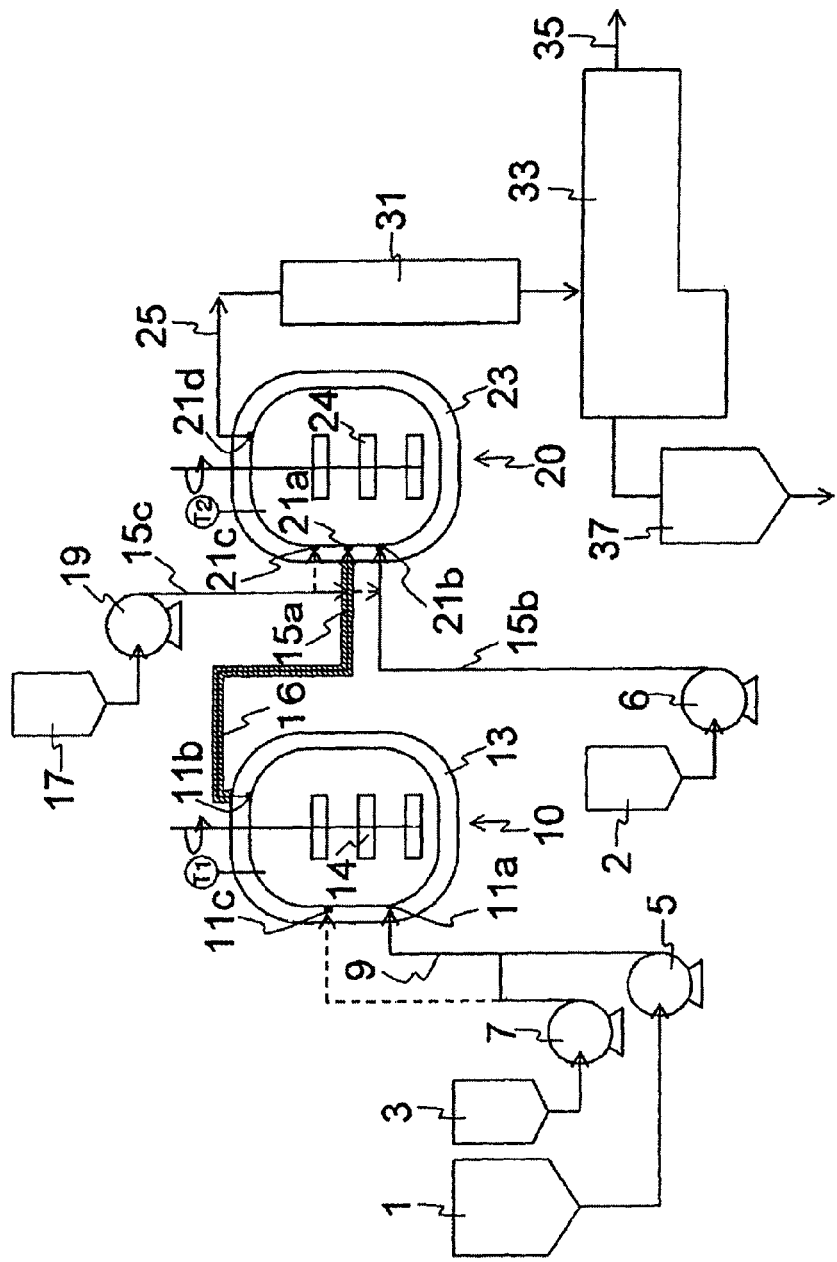
FIG. 2 is a schematic view of an example of the continuous polymerization apparatus according to the present invention that has a jacket provided on a connection line in the embodiment of FIG. 1.
Figure 3:
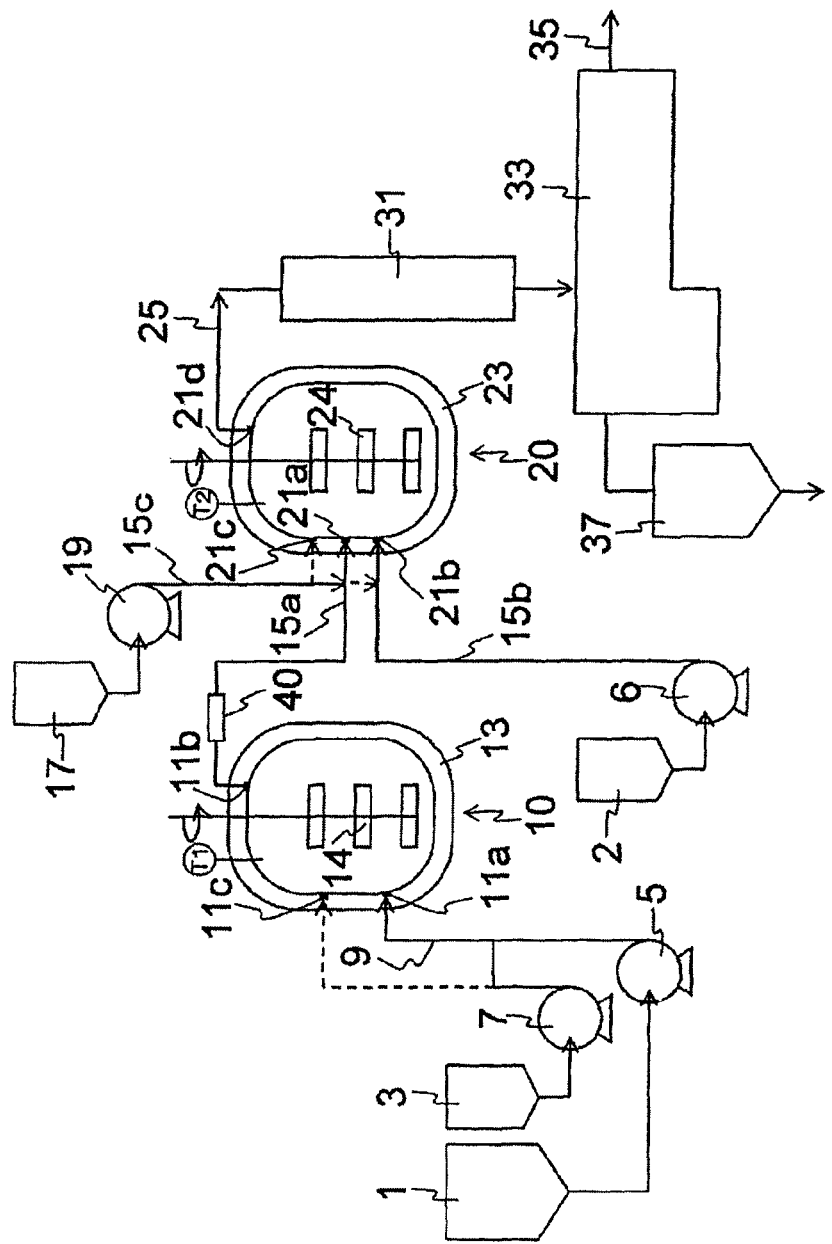
FIG. 3 is a schematic view of an example of the continuous polymerization apparatus according to the present invention that has a cooler provided on the connection line in the embodiment of FIG. 1.

The connection line 15a connecting the effluent port 11b of the first reactor 10 to the first supply port 21a of the second reactor 20 may include a jacket 16 (indicated by hatching in FIG. 2) surrounding a part or all of an outer wall face of the connection line 15a, or a cooler 40 replacing a part of the connection line 15a as depicted in FIG. 3, or a trace pipe through which a cooling medium passes, etc., as a cooling means capable of at least partially cooling the connection line 15a (the connection line equipped with the jacket is understood as a double pipe). The cooling of the connection line 15a by the cooling means can cause the temperature of the connection line 15a (for example, the temperature in the connection line) to be lower corresponding to the temperature of the first reactor 10 and/or the second reactor 20, etc. Because the first reactor 10 includes the temperature sensor $T_1$ as the temperature detecting means to detect the temperature in the first reactor 10 as described above, the jacket 16 (FIG. 2) or the cooler 40 (the cooling means) (FIG. 3) of the connection line 15a can control the temperature in the connection line 15a connected to the second reactor 20 to be lower than the temperature in the first reactor 10 that is detected by the temperature sensor $T_1$. The cooler 40 may be provided on the upstream site as depicted in FIG. 3 (that is, on the site closer to the first reactor 10), or on the downstream site (that is, on the site closer to the second reactor 20), and may be disposed in the connection line 15a in an arbitrary proper form. Preferably, the cooler 40 is, however, disposed on the upstream site. The heat in the line parts other than the cooler 40 of the connection line 15a may be retained by covering the line part with a lagging material (not depicted), or the line part may be cooled by concurrently using a jacket (not depicted in FIG. 3) surrounding the outer wall face of the connection line 15a.

Though not essential to the present invention, preferably, the connection line 15a includes a mixing means based on the point that the evenness of the temperature distribution in the connection line 15a can be improved and any occlusion of the connection line 15a caused by the intermediate composition (described later) flowing through the connection line 15a can be suppressed. Preferably, the mixing means is provided on the connection line 15a in a portion on its downstream site, that is, on the site closer to the first supply port 21a of the second reactor 20 based on the point that the cooling efficiency is improved. The mixing means can be, for example, a static mixer and a dynamic mixer, and the like, among these, preferably, the static mixer is used. The static mixer is a mixer that needs no driving unit, and is provided in the connection line 15a in an arbitrary proper form. For example, in FIGS. 1 and 2, the static mixer may be inserted into the connection line 15a at a proper position in the inside of the downstream portion thereof, or a part or the whole of the downstream portion of the connection line 15a may be replaced with the static mixer forming the line. In FIG. 3, the static mixer may be inserted into the connection line 15a at a proper position in the inside of the downstream portion thereof (when the cooler 40 is present, a line part other than the cooler 40), or a part or all of the downstream portion of the connection line 15a (when the cooler 40 is present, the line part other than the cooler 40) may be replaced with the static mixer forming the line. The static mixer can be, for example, a "Sulzer mixer" manufactured by Sulzer Chemtech Ltd, and the like, for example, Sulzer mixers of SMX type, SMI type, SMV type, SMF type, and SMXL type, and the like, may be usable. When the polymerization initiator tank 17 is connected to the connection line 15a through the pump 19, preferably, the mixing means is provided in a downstream portion of a combining part of the supply line 15c connected to the polymerization initiator tank 17 and the connection line 15a.

In the embodiment of FIG. 3, a cooler 40 formed by combining a cooling means and a mixing means may be provided as the cooler 40. The cooler 40 formed by combining a cooling means and a mixing means can be a cooler having a dynamic mixing function, and a cooler having a static mixing function. The cooler having the dynamic mixing function can be, for example, a screw mixer capable of cooling a cylinder, etc. The cooler having the static mixing function can be, for example, a heat exchanger with a built-in static mixer, etc. Preferably, the SMR-type Sulzer mixer manufactured by Sulzer Chemtech Ltd., is used as the heat exchanger with a built-in static mixer based on the point that a heat-transfer area is large and a high cooling capacity can be acquired. When the heat exchanger with a built-in static mixer is used as the cooler 40, a part or all of the connection line 15a may be replaced with the heat exchanger with a built-in static mixer forming the line.

As described above with reference to FIG. 1, the replenishing line 15b is connected to the raw material monomer tank (the supply source of the raw material monomer and, when necessary, other component(s) such as a chain transfer agent) 2 through the pump 6. Preferably, at least one of the raw material monomer tank 2 and the replenishing line 15b includes a temperature regulating means. The raw material monomer tank 2 may include, for example, a jacket covering at least partially the outer wall face of the raw material monomer tank 2 as the temperature regulating means, and such temperature regulating means can regulate the temperature of the raw material monomer in the raw material monomer tank 2. When the raw material monomer tank 2 includes the jacket, preferably, the raw material monomer tank 2 further includes a stirring and mixing means to stir the raw material monomer in the raw material monomer tank 2 based on the point that the temperature regulation can more efficiently be conducted. The replenishing line 15b may include, for example, a jacket covering at least partially the outer wall face of the replenishing line 15b, a heater/cooler replacing a part of the replenishing line 15b, or a trace pipe through which a cooling/heating medium passes, as the temperature regulating means (the replenishing line 15b including the jacket is understood as a double pipe), or the like, and such temperature regulating means can regulate the temperature of the raw material monomer flowing through the replenishing line 15b. Such heater/coolers may each be used as the heater/cooler, as a heater/cooler having both a heating/cooling means and a mixing means such as, for example, those each having a dynamic mixing function (for example, a screw mixer capable of heating and cooling a cylinder) and those each having a static mixing function (for example, a heat exchanger with a built-in static mixer, and the like). The temperature of the new raw material monomer supplied from the replenishing line 15b to the second reactor 20 can be regulated by using of the temperature regulating means provided on the raw material monomer tank 2 and/or the replenishing line 15b as described above.

The temperature regulating means provided in the raw material monomer tank 2 and/or the replenishing line 15b can regulate the temperature of the raw material monomer supplied to the second reactor 20 corresponding to the temperature of the first reactor 10 and/or the second reactor 20, etc. Because the first reactor 10 includes the temperature sensor $T_1$ as the temperature detecting means to detect the temperature in the first reactor 10 as described above, the temperature regulating means provided in the raw material monomer tank 2 and/or the replenishing line 15b can control the temperature in the replenishing line 15b in the vicinity of the second supply port 21b of the second reactor 20, especially, the temperature of the raw material monomer to be lower than the temperature in the first reactor 10 detected by this temperature sensor $T_1$. Such examples and method are, however, not limited to the above, as examples of the temperature regulating means provided in the raw material monomer tank 2 and/or the replenishing line 15b and as the method of regulating the temperature of the new raw material monomer supplied to the second reactor 20.

Preferably, the members described above with reference to FIG. 1 are properly connected to a control means (not depicted) described later, and are holistically configured for the operations thereof to be controllable by the control means. Thereby, to cause the temperature of the outer wall face of the reactor set for each of the jackets (temperature regulating means) 13 and 23 and the temperatures in the reactors detected by the temperature sensors (the temperature detecting means) ($T_1$, $T_2$) to be equal respectively for the first reactor 10 and the second reactor 20 (in other words, to realize an adiabatic condition in each of the first reactor 10 and the second reactor 20), the supply amounts of the raw material monomer and the polymerization initiator to the first reactor 10 can be adjusted by the operations of the pumps 5 and 7, or the temperature of the outer wall face of the reactor set for the jackets 13 and 23 can be regulated, and, when the polymerization initiator tank 17 and the pump 19 are present, the additional supply amount of the polymerization initiator (or the raw material monomer and the polymerization initiator) to the second reactor 20 can be adjusted by the operation of the pump 19. To avoid any excessively high polymerization temperature in the second reactor 20 achieving a desired polymerization conversion in the second reactor 20, the temperature in the replenishing line 15b in the vicinity of the second supply port 21b of the second reactor 20 can be caused to be lower than the temperature in the first reactor 10 detected by the temperature sensor (the temperature detecting means) $T_1$ by adjusting the supply amount of the new raw material monomer to the second reactor 20 using the operation of the pump 6.

When the cooling means is concurrently used, the temperature in the connection line 15a in the vicinity of the first supply port 21a of the second reactor 20 can be caused to be lower than the temperature in the first reactor 10 detected by the temperature sensor (the temperature detecting means) $T_1$ by adjusting the temperature of the outer wall face of the connection line 15a set for the jacket (the cooling means) 16 covering the connection line 15a in FIG. 2, and by adjusting the set temperature of the cooler 40 replacing a part of the connection line 15a in FIG. 3. Preferably, the temperature in the connection line 15a is actually measured at a point, in the vicinity of the first supply port 21a of the second reactor 20 and, when necessary, another point, by a temperature detecting means to detect the temperature in the connection line 15a. Depending on the polymerization reaction conditions in the first reactor 10, however, due to the factors such as complete consumption of the supplied polymerization initiator, a polymerization reaction of an intermediate composition (described later) taken out from the effluent port 11b sometimes does not take place in the connection line 15a, that is, no heat of the polymerization reaction may be generated in the connection line 15a. In this case, the temperature in the connection line 15a in the vicinity of the effluent port 11b of the first reactor 10 may be considered to be substantially equal to the temperature in the first reactor 10 detected by the temperature sensor (the temperature detecting means) $T_1$. In this case, it is considered that the temperature in the connection line 15a in the vicinity of the first supply port 21a of the second reactor 20 becomes lower than the temperature in the first reactor 10 by setting the temperature of the jacket 16 (when the jacket 16 is present) covering the connection line 15a, or the temperature of the cooler 40 (when the cooler 40 is present) replacing the part of the connection line 15a to be lower than the temperature in the first reactor 10. In FIG. 3, when a jacket is provided on the line part other than the cooler 40 of the connection line 15a surrounding the circumference thereof, the temperature in the connection line 15a may be adjusted by concurrently using the jacket.

The jackets 13 and 23 respectively cover the substantially overall reactors 10 and 20 to properly heat or retain the heat of the reactors 10 and 20 by introducing a heat medium such as steam, hot water, or an organic heat medium from a heat medium supply route (not depicted). The temperatures of the jackets 13 and 23 can properly be regulated by using of the temperature or the pressure of the heat medium to be supplied.

The heat medium introduced into the jackets 13 and 23 is removed through a heat medium discharge route (not depicted). The temperatures and the pressures of the jackets 13 and 23 are detected by sensors such as a temperature sensor (not depicted) provided in the heat medium discharge route. The point for the sensor such as the temperature sensor to be provided is not especially limited, and the sensor may be provided, for example, in the heat medium supply route and in the jackets 13 and 23. The jacket 16 provided on the connection line 15a as a cooling means in FIG. 2, and the jacket, when the jacket is present, provided on the raw material monomer tank 2 and/or the replenishing line 15b as the temperature regulating means may each have the same constitution as those of the jackets 13 and 23. Though not limiting the embodiment of FIG. 2, the connection line 15a may typically be a double pipe whose internal space of the inner pipe thereof is a flow path of the intermediate composition (described later), and the space between the inner pipe and the outer pipe is a flow path of the heat medium (or the jacket 16).

For the polymerization reactions in the reactors 10 and 20, it is required to conduct the polymerization reactions in the reactors 10 and 20 each at a substantially constant temperature from the viewpoint that the quality of the produced polymer composition is set to be constant. The temperature regulating means (the jackets 13 and 23) are therefore each controlled to at a constant temperature set in advance for the internal temperature of each of the reactors 10 and 20 to be able to be maintained at a substantially constant temperature.

The set temperatures of the temperature regulating means (the jackets 13 and 23) are transmitted to the control means described later, to be used as data to determine whether any control is necessary of the supply flow rates by the monomer supply means (the pumps 5 and 6) and the initiator supply means (the pump 7, and the pump 19 when the pump 19 is present).

The set temperature of the temperature regulating means (the jackets 13 and 23) can be regulated by controlling the temperature or the pressure of the heat medium.

The control means can be, for example, a control unit (not depicted) including a CPU, a ROM, a RAM, etc.

The ROM of the control unit is a device capable of storing program(s) to control the pumps 5 to 7, and the pump 19, etc., when the pump 19, etc., are present. The RAM of the control unit is a device capable of, to execute the program(s), temporarily storing the data of the temperatures in the reactors 10 and 20 detected by the temperature sensors ($T_1$, $T_2$), data of the set temperatures of the jackets 13 and 23, and data of the set temperature of the jacket 16 or the cooler 40 of the connection line 15a when the jacket 16 or the cooler 40 is present.

The CPU of the control unit can execute the program(s) stored in the ROM based on the data of the temperatures in the reactors 10 and 20 and the data of the set temperatures of the jackets 13 and 23 stored in the RAM, to cause the monomer supply means (the pumps 5 and 6) and/or the initiator supply means (the pump 7, and the pump 19 when the pump 19 is present) to control the supply flow rates of the raw material monomer and/or the polymerization initiator to the reactors 10 and 20. Especially, as to the new raw material monomer supplied from the replenishing line 15b to the second reactor 20, the CPU of the control unit can execute the program(s) stored in the ROM (that may be a part of the program(s), or program(s) other than the program(s)) based on the data of the temperatures in the reactors 10 and 20, and the data of the set temperature of the jacket 16 or the cooler 40 of the connection line 15a, that are stored in the RAM, and, when actual measurement is executed, the temperatures in the connection line 15a in the vicinity of the first supply port 21a of the second reactor 20 and other points, to cause the monomer supply means (the pump 6) to control the supply flow rate of the raw material monomer from the replenishing line 15b to the second reactor 20. Similarly, as to the jacket 16 or the cooler 40 being able to be provided to the connection line 15a as the cooling means, the set temperature of the jacket 16 or the cooler 40 of the connection line 15a can be adjusted.

One example of the control by the control means (the control unit) will be described.

When the temperature in the reactor 10 detected by the temperature sensor $T_1$ exceeds the set temperature of the jacket 13 that is the temperature regulating means, the CPU executes the program(s) in the ROM to control the pump 7 to, for example, decrease the supply flow rate of the polymerization initiator into the reactor 10. When the temperature in the reactor 20 detected by the temperature sensor $T_2$ exceeds the set temperature of the jacket 23 that is the temperature regulating means, the CPU executes the program(s) in the ROM to control the pump 6 to, for example, increase the supply flow rate of the raw material monomer from the replenishing line 15b to the second reactor 20. In the case where the polymerization initiator tank 17 and the pump 19 are present, when the temperature in the reactor 20 detected by the temperature sensor $T_2$ exceeds the set temperature of the jacket 23 that is the temperature regulating means during the supply of the polymerization initiator by the pump 19 to the reactor 20 to conduct the polymerization, the CPU executes the program(s) in the ROM to control the pump 19 to, for example, decrease the supply flow rate of the polymerization initiator into the reactor 20. The conducting of this control enables reduction of the polymerization heat generated in the reactor(s) 10 and/or 20, and, as a result, the temperature(s) in the reactor(s) 10 and/or 20 can be lowered.

On the other hand, when the temperature in the reactor 10 is lower than the set temperature of the jacket 13, the CPU executes the program(s) in the ROM to control the pump 7 to, for example, increase the supply flow rate of the polymerization initiator into the reactor 10. When the temperature in the reactor 20 is lower than the set temperature of the jacket 23, the CPU executes the program(s) in the ROM to control the pump 6 to, for example, decrease the supply amount of the raw material monomer from the replenishing line 15b to the second reactor 20. In the case where the polymerization initiator tank 17 and the pump 19 are present, when the temperature in the reactor 20 is lower than the set temperature of the jacket 23 during the supply of the polymerization initiator by the pump 19 to the reactor 20 to conduct the polymerization, the CPU executes the program(s) in the ROM to control the pump 19 to, for example, increase the supply flow rate of the polymerization initiator into the reactor 20. The conducting of this control enables the polymerization heat generated in the reactor(s) 10 and/or 20 to increase and, as a result, the temperature(s) in the reactor(s) 10 and/or 20 can be increased.

For example, for the polymerization reactions in the reactors 10 and 20, in the case where the pumps 5 to 7 and the pump 19 when the pump 19 is present are controlled and, as a result, the total supply flow rate to the reactors 10 and 20 is significantly decreased, preferably, not only the pump 6 is controlled to decrease the supply flow rate of the raw material monomer, and the pump 7 and the pump 19 when the pump 19 is present is/are controlled to decrease the supply flow rate of the polymerization initiator but also the pump 5 is concurrently controlled to increase the supply flow rate of the raw material monomer.

Another exemplary control can be the following control. When the temperature in the reactor 10 detected by the temperature sensor $T_1$ exceeds the set temperature of the jacket 13 that is the temperature regulating means, the pump 5 is controlled to increase the supply flow rate of the raw material monomer and the relative supply flow rate of the polymerization initiator into the reactor 10 is thereby decreased. This control can also decrease the temperature in the reactor 10.

Ratio of the total supply flow rate of the raw material monomer to the supply flow rate of the polymerization initiator may properly be determined corresponding to the type of the polymer to be produced, the type of the polymerization initiator to be used, etc.

The degree of the increase or the decrease of each of the supply flow rate of the raw material monomer and the supply flow rate of the polymerization initiator is also properly determined corresponding to the type of the polymer composition to be produced, the type of the polymerization initiator to be used, etc. It is, however, necessary to control the supply flow rate of the polymerization initiator taking into consideration the content proportion of the polymerization initiator in the raw material monomer containing the polymerization initiator when the material supplied to the reactors 10 and 20 by the initiator supply means is not the polymerization initiator alone but is the raw material monomer containing the polymerization initiator.

Another exemplary control can be the following control for the jacket 16 or the cooler 40 that may be provided to the connection line 15a as the cooling means. When the temperature in the connection line 15a in the vicinity of the first supply port 21a of the second reactor 20 is equal to or higher than the temperature in the first reactor 10 detected by the temperature sensor $T_1$, the CPU may execute the program(s) in the ROM to thereby adjust the temperature in the connection line 15a to cause the temperature in the connection line 15a in the vicinity of the first supply port 21a of the second reactor 20 to be lower than the temperature in the first reactor 10, and to be, preferably, lower than the temperature therein by 5 to 80° C. When the jacket 16 or the cooler 40 is present, the CPU controls an equipment(s) associated with the jacket 16 or the cooler 40 (not depicted) to adjust the set temperature of the jacket 16 or the cooler 40 of the connection line 15a to be a lower temperature.

Though the set temperature of the jacket 16 of the connection line 15a is not especially limited, this set temperature can generally be adjusted by controlling the flow rate and/or the temperature of the heat medium flowing through the jacket 16. Though the set temperature of the cooler 40 of the connection line 15a is not especially limited, when a heat exchanger with a built-in static mixer is used as the cooler 40, this set temperature can generally be adjusted by controlling the flow rate and/or the temperature of the heat medium flowing through the heat exchanger with a built-in static mixer.

The following control may be conducted as exemplary advantageous control. When the temperature in the second reactor 20 detected by the temperature sensor $T_2$ of the second reactor 20 is equal to or higher than the temperature in the first reactor 10 detected by the temperature sensor $T_1$ of the first reactor 10, the CPU may execute the program(s) in the ROM to thereby control the temperature in the connection line 15a in the vicinity of the first supply port 21a of the second reactor 20 to be lower than the temperature in the first reactor 10, and to be, preferably, lower than the temperature therein by 5 to 80° C., to control the pump 6 to properly adjust the supply flow rate of the raw material monomer supplied from the replenishing line 15b to the second reactor 20, and, when the jacket 16 or the cooler 40 is concurrently used, to control as above to adjust the set temperature of the jacket 16 or the cooler 40 (and, when the cooler 40 and the jacket are concurrently used, the jacket) of the connection line 15a, or to control the pumps 5 and 7, and the pump 19, when the pump 19 is present, to adjust other supply flow rate(s) to the reactor(s) 10 and/or the reactor 20. The difference can, thereby, be decreased between the temperature in the first reactor 10 and the temperature in the second reactor 20. When any polymerization heat is generated in the second reactor 20 due to the presence of the polymerization initiator tank 17 and the pump 19, etc., it is effective to control the pump 6 to adjust the supply flow rate of the raw material monomer, and, when the jacket 16 or the cooler 40 is concurrently used, to adjust the set temperature of the jacket 16 or the cooler 40 (and, when the cooler 40 and a jacket are concurrently used, the jacket) of the connection line 15a.

Advantageous exemplary control is as follows. When the temperature in the second reactor 20 detected by the temperature sensor $T_2$ of the second reactor 20 is equal to or higher than the temperature in the first reactor 10 detected by the temperature sensor $T_1$ of the first reactor 10, the CPU executes the program(s) in the ROM to, thereby, control the temperature regulating means (when the temperature regulating means is present) provided in the raw material monomer tank 2 and/or the replenishing line 15b to decrease the temperature of the raw material monomer supplied to the second reactor 20, or to decrease the supply amount from the polymerization initiator tank 17, and the difference can thereby be decreased between the temperature in the first reactor 10 and the temperature in the second reactor 20.

Though not essential for this embodiment, a preheater 31 and a devolatilizing extruder 33 may be provided downstream the effluent line 25. A pressure adjusting valve (not depicted) may be provided between the preheater 31 and the devolatilizing extruder 33. An extruded object after devolatilization is discharged from a discharge line 35.

An arbitrary proper heater may be used as the preheater 31 as long as the heater can heat a viscous fluid. A single or multi screw devolatilizing extruder may be used as the devolatilizing extruder 33.

A recovery tank 37 may be present that stores the raw material monomer(s) separated and recovered from volatile component(s) (including mainly the unreacted raw material monomer(s)) separated by the devolatilizing extruder 33.

Subsequently, a production method of a polymer composition being able to be conducted by using of the above-described apparatus will be described. Though the case will be described in this embodiment, as an example, where a methacrylic ester monomer is continuously polymerized, in other words, where a methacrylic ester polymer is produced, the present invention is not limited to this case.

Preparation

The raw material monomer, the polymerization initiator, etc., are first prepared, and the raw material monomer and the polymerization initiator are not limited to the following.

A methacrylic ester monomer is used in this embodiment as the raw material monomer.

The methacrylic ester monomer can be, for example,
  alkyl methacrylate (whose alkyl group contains 1 to 4 carbons) alone, or
  a mixture of alkyl methacrylate (whose alkyl group contains 1 to 4 carbons) equal to or more than 80% by weight and another vinyl monomer copolymerizable therewith equal to or less than 20% by weight.

Alkyl methacrylate (whose alkyl group contains 1 to 4 carbons) can be, for example, methyl methacrylate, ethyl methacrylate, n-propyl methacrylate, isopropyl methacrylate, n-butyl methacrylate, t-butyl methacrylate, sec-butyl methacrylate, isobutyl methacrylate, etc. Preferably, among these, methyl methacrylate is used. Each alkyl methacrylate exemplified above may be used alone, or two or more thereof may be used mixed with each other.

Copolymerizable vinyl monomer can be, for example, monofunctional monomers each having 1 double bond that is radical-polymerizable and multifunctional monomers each having 2 or more double bonds that are radical-polymerizable. Specifically, the monofunctional monomers each having 1 double bond that is radical-polymerizable can be, for example, methacrylic esters such as benzyl methacrylate and 2-ethylhexyl methacrylate (except the above alkyl methacrylate (whose alkyl group contains 1 to 4 carbons)); acrylic esters such as methyl acrylate, ethyl acrylate, propyl acrylate, butyl acrylate, and 2-ethylhexyl acrylate; unsaturated carboxylic acids or acid anhydrides thereof such as acrylic acid, methacrylic acid, maleic acid, itaconic acid, maleic acid anhydride, and itaconic acid anhydride; hydroxyl group-containing monomers such as 2-hydroxyethyl acrylate, 2-hydroxypropyl acrylate, monoglycerol acrylate, 2-hydroxyethyl methacrylate, 2-hydroxypropyl methacrylate, and monoglycerol methacrylate; nitrogen-containing monomers such as acrylamide, methacrylamide, acrylonitrile, methacrylonitrile, diacetoneacrylamide, and dimethylaminoethyl methacrylate; epoxy group-containing monomers such as allyl glycidyl ether, glycidyl acrylate, and glycidyl methacrylate; styrene-based monomers such as styrene and α-methylstyrene. The multifunctional monomers each containing 2 or more double bonds that are radical-polymerizable can be, for example, diesters of unsaturated carboxylic acids of glycols such as ethylene glycol dimethacrylate, and butanediol dimethacrylate; unsaturated carboxylic acid alkenyl esters such as allyl acrylate, allyl methacrylate, and allyl cinnamate; polybasic acid polyalkenyl esters such as diallyl phthalate, diallyl maleate, triallyl cyanurate, and triallyl isocyanurate; esters of unsaturated carboxylic acids of polyalcohols such as trimethylolpropane triacrylate; and divinylbenzene. Each copolymerizable vinyl monomer exemplified above may be used alone, or 2 or more thereof may be used mixed with each other.

The raw material monomer may be separately supplied to the first reactor 10 and the second reactor 20. To the second reactor 20, the raw material monomer may be supplied to the second reactor 20 through the replenishing line 15b. The raw material monomer capable of being supplied to the first reactor 10 and that to the second reactor 20 may be same as, or may be different from each other.

For example, a radical initiator is used in this embodiment as the polymerization initiator.

The radical initiator can be, for example, azo compounds such as azobisisobutyronitrile, azobisdimethylvaleronitrile, azobiscyclohexanenitrile, 1,1'-azobis(1-acetoxy-1-phenylethane), dimethyl 2,2'-azobisisobutylate, and 4,4'-azobis-4-cyanovaleric acid; and organic peroxides such as benzoyl peroxide, lauroyl peroxide, acetyl peroxide, caprylyl peroxide, 2,4-dichlorobenzoyl peroxide, isobutyl peroxide, acetyl cyclohexylsulfonyl peroxide, t-butyl peroxypivalate, t-butyl peroxyneodecanoate, t-butyl peroxyneoheptanoate, t-butyl peroxy-2-ethylhexanoate, 1,1-di(t-butylperoxy)cyclohexane, 1,1-di(t-butylperoxy)-3,3,5-trimethylcyclohexane, 1,1-di(t-hexylperoxy)-3,3,5-trimethylcyclohexane, diisopropyl peroxydicarbonate, diisobutyl peroxydicarbonate, di-sec-butyl peroxydicarbonate, di-n-butyl peroxydicarbonate, bis(2-ethylhexyl)peroxydicarbonate, bis(4-t-butylcyclohexyl)peroxydicarbonate, t-amyl peroxy-2-ethylhexanoate, 1,1,3,3-tetramethylbutyl peroxy-ethylhexanoate, 1,1,2-trimethylpropyl peroxy-2-ethylhexanoate, t-butyl peroxy isopropyl monocarbonate, t-amyl peroxy isopropyl monocarbonate, t-butyl peroxy-2-ethylhexyl carbonate, t-butyl peroxy allyl carbonate, t-butyl peroxy isopropyl carbonate, 1,1,3,3-tetramethylbutyl peroxy isopropyl monocarbonate, 1,1,2-trimethyl propyl peroxy isopropyl monocarbonate, 1,1,3,3-tetramethyl butyl peroxy isononate, 1,1,2-trimethyl propyl peroxy-isononate, and t-butyl peroxybenzoate.

Each of these polymerization initiators may be used alone, or 2 or more thereof may be used mixed with each other.

The polymerization initiator is selected corresponding to the types of the polymer composition to be produced and the raw material monomer to be used. For example, though not especially limiting the present invention, with "τ" (sec) representing a half-life of the polymerization initiator at the polymerization temperature and "θ" (sec) representing the average residence time in a reactor, a usable polymerization initiator (or a radical initiator) is the one whose $\tau/\theta$ (−) is, for example, equal to or smaller than 0.1, is, preferably, equal to or smaller than 0.02, and is, more preferably, equal to or smaller than 0.01. When the value of $\tau/\theta$ is equal to or smaller than the above values, the polymerization initiator is sufficiently decomposed (as a result, generating a radical(s)) in the reactor, and the polymerization reaction can effectively be initiated. Because the polymerization initiator is sufficiently decomposed in the first reactor 10, any decomposition of the polymerization initiator causing the polymerization to be initiated in the connection line 15a can effectively be suppressed, and, as a result, any increase of the viscosity of the resulting intermediate composition during its passage through the connection line 15a and any occlusion of the connection line 15a, due to the intermediate composition can effectively be avoided.

Though the supply amount of the polymerization initiator (or the radical initiator) is not especially limited, the supply amount is generally 0.001 to 1% by weight to the raw material monomer (the raw material monomer finally supplied to the reactors 10 and 20). When the polymerization initiator tank 17 and the pump 19 are present in addition to the polymerization initiator tank 3 and the pump 7, the polymerization initiator can be supplied separately into the first reactor 10 and the second reactor 20. When the mixture of the raw material monomer and the polymerization initiator is supplied from the polymerization initiator tank 17 to the second reactor 20 by the pump 19, the total supply amount of the polymerization initiator supplied to the reactor 10 and the reactor 20 may be set to be within the above ranges to the total amount of the raw material monomer finally supplied to the reactors 10 and 20 and the raw material monomer newly supplied to the reactor 20.

In addition to the raw material monomer and the polymerization initiator, such other arbitrary proper component(s) may be used as, for example, a chain transfer agent, a mold release agent, a rubbery polymer such as butadiene and styrene-butadiene rubber (SBR), a thermal stabilizing agent, and an ultraviolet absorbing agent. The chain transfer agent is used to adjust a molecular weight of the produced polymer. The mold release agent is used to improve the moldability of a resin composition obtained from the polymer composition. The thermal stabilizing agent is used to suppress any thermal degradation of the produced polymer. The ultraviolet absorbing agent is used to suppress any degradation of the produced polymer due to ultraviolet rays.

The chain transfer agent may be either monofunctional or multifunctional chain transfer agent. Specifically, the chain transfer agent can be, for example, alkyl mercaptans such as n-propyl mercaptan, isopropyl mercaptan, n-butyl mercaptan, t-butyl mercaptan, h-hexyl mercaptan, n-octyl mercaptan, 2-ethylhexyl mercaptan, n-dodecyl mercaptan, and t-dodecyl mercaptan; aromatic mercaptans such as phenyl mercaptan and thiocresol; mercaptans containing 18 or less carbons such as ethylene thioglycol; polyalcohols such as ethylene glycol, neopentyl glycol, trimethylolpropane, pentaerythritol, dipentaerythritol, tripentaerythritol, and sorbitol; and those whose hydroxyl group(s) is/are esterified with thioglycolic acid or 3-mercaptopropionic acid, 1,4-dihydronaphthalene, 1,4,5,8-tetrahydronaphthalene, β-terpinene, terpinolene, 1,4-cyclohexadiene, and hydrogen sulfide, etc. Each of these may be used alone, or two or more thereof may be used in combination.

Though the supply amount of the chain transfer agent differs corresponding to the type of the used chain transfer agent, etc., and is therefore not especially limited, for example, when a mercaptan is used, the supply amount thereof is, preferably, 0.01 to 3% by weight, and is, more preferably, 0.05 to 1% by weight to the raw material monomer (the raw material monomer finally supplied to the reactors 10 and 20).

Though the mold release agent is not especially limited, the mold release agent can be, for example, esters of higher fatty acids, higher fatty alcohols, higher fatty acids, higher fatty acid amides, and metal salts of higher fatty acids, etc. One type of mold release agent may be used, or two or more types thereof may be used.

Specifically, the esters of higher fatty acids can be, for example, saturated fatty acid alkyl esters such as methyl laurate, ethyl laurate, propyl laurate, butyl laurate, octyl laurate, methyl palmitate, ethyl palmitate, propyl palmitate, butyl palmitate, octyl palmitate, methyl stearate, ethyl stearate, propyl stearate, butyl stearate, octyl stearate, stearyl stearate, myristyl myristate, methyl behenate, ethyl behenate, propyl behenate, butyl behenate, and octyl behenate; unsaturated fatty acid alkyl esters such as methyl oleate, ethyl oleate, propyl oleate, butyl oleate, octyl oleate, methyl linoleate, ethyl linoleate, propyl linoleate, butyl linoleate, and octyl linoleate; saturated fatty acid glycerides such as lauric monoglyceride, lauric diglyceride, lauric triglyceride, palmitic monoglyceride, palmitic diglyceride, palmitic triglyceride, stearic monoglyceride, stearic diglyceride, stearic triglyceride, behenic monoglyceride, behenic diglyceride, and behenic triglyceride; and unsaturated fatty acid glycerides such as oleic monoglyceride, oleic diglyceride, oleic triglyceride, linolic monoglyceride, linolic diglyceride, and linolic triglyceride. Among these, preferably, methyl stearate, ethyl stearate, butyl stearate, octyl stearate, stearic monoglyceride, stearic diglyceride, stearic triglyceride, etc., are used.

Specifically, the higher fatty alcohols can be, for example, saturated fatty alcohols such as lauryl alcohol, palmityl alcohol, stearyl alcohol, isostearyl alcohol, behenyl alcohol, myristyl alcohol, and cetyl alcohol; and unsaturated fatty alcohols such as oleyl alcohol, and linolyl alcohol. Among these, preferably, stearyl alcohol is used.

Specifically, the higher fatty acids can be, for example, saturated fatty acids such as caproic acid, caprylic acid, capric acid, lauric acid, myristic acid, palmitic acid, stearic acid, arachidic acid, behenic acid, lignoceric acid, and 12-hydroxyoctadecanoic acid; and unsaturated fatty acids such as palmitoleic acid, oleic acid, linoleic acid, linolenic acid, cetoleic acid, erucic acid, and ricinoleic acid.

Specifically, the higher fatty acid amides can be, for example, saturated fatty acid amides such as lauric acid amide, palmitic acid amide, stearic acid amide, and behenic acid amide; unsaturated fatty acid amides such as oleic acid amide, linoleic acid amide, and erucic acid amide; and amides such as ethylene-bis-lauric acid amide, ethylene-bis-palmitic acid amide, ethylene-bis-stearic acid amide, and N-oleyl stearamide. Among these, preferably, stearic acid amide and ethylene-bis-stearic acid amide are used.

The metal salts of higher fatty acids can be, for example, sodium salts, potassium salts, calcium salts, barium salts of the above-described higher fatty acids, etc.

The use amount of the mold release agent is, preferably, adjusted to be 0.01 to 1.0 part by weight, and is, more preferably, adjusted to be 0.01 to 0.50 parts by weight to 100 parts by weight of a polymer composition contained in the polymer composition to be obtained.

Though the thermal stabilizing agent is not especially limited, the thermal stabilizing agent can be, for example, a phosphorous-based thermal stabilizing agent, an organic disulfide compound, etc. Among these, preferably, the organic disulfide compound is used. One type of thermal stabilizing agent may be used alone, or two or more types thereof may be used.

The phosphorus-based thermal stabilizing agents can be, for example, tris(2,4-di-t-butylphenyl)phosphite, 2-[[2,4,8,10-tetrakis(1,1-dimethylethyl)dibenzo[d,f][1,3,2]dioxaphosphepine-6-yl]oxy]-N,N-bis[2-[[2,4,8,10-tetrakis(1,1-dimethylethyl)dibenzo[d,f][1,3,2]dioxaphosphepine-6-yl]oxy]-ethyl]ethanamine, diphenyltridecyl phosphite, triphenyl phosphite, 2,2-methylenebis(4,6-di-tert-butylphenyl)octylphosphite, bis(2,6-di-tert-butyl-4-methylphenyl) pentaerythritol diphosphite, etc. Among these, preferably, 2,2-methylenebis(4,6-di-tert-butylphenyl)octylphosphite is used.

The organic disulfide compounds can be, for example, dimethyl disulfide, diethyl disulfide, di-n-propyl disulfide, di-n-butyl disulfide, di-sec-butyl disulfide, di-tert-butyl disulfide, di-tert-amyl disulfide, dicyclohexyl disulfide, di-tert-octyl disulfide, di-n-dodecyl disulfide, di-tert-dodecyl disulfide, etc. Among these, preferably, di-tert-alkyl disulfide is used, and, more preferably, di-tert-dodecyl disulfide is used.

Preferably, the use amount of the thermal stabilizing agent is 1 to 2,000 ppm by weight to a polymer composition contained in the polymer composition to be obtained. When the polymer composition (for example, a resin composition after devolatilization) is molded to obtain a molded object from the polymer composition according to the present invention, the molding temperature may be set to be at a relatively high temperature aiming at improving its molding efficiency. In this case, blending of the thermal stabilizing agent is further effective.

Types of the ultraviolet absorbing agent can be, for example, a benzophenone-based ultraviolet absorbing agent, a cyanoacrylate-based ultraviolet absorbing agent, a benzotriazole-based ultraviolet absorbing agent, a malonic ester-based ultraviolet absorbing agent, an oxalic anilide-based ultraviolet absorbing agent, etc. Each of these ultraviolet absorbing agents may be used alone, or two or more thereof may be used in combination. Among these, preferably, the benzotriazole-based ultraviolet absorbing agent, the malonic ester-based ultraviolet absorbing agent, and the oxalic anilide-based ultraviolet absorbing agent are used.

The benzophenone-based ultraviolet absorbing agents can be, for example, 2,4-dihydroxybenzophenone, 2-hydroxy-4-methoxybenzophenone, 2-hydroxy-4-methoxybenzophenone-5-sulfonic acid, 2-hydroxy-4-octyloxybenzophenone, 4-dodecyloxy-2-hydroxybenzophenone, 4-benzyloxy-2-hydroxybenzophenone, 2,2'-dihydroxy-4,4'-dimethoxybenzophenone, etc.

The cyanoacrylate-based ultraviolet absorbing agents can be, for example, ethyl 2-cyano-3,3-diphenylacrylate, 2-ethylhexyl 2-cyano-3,3-diphenylacrylate, etc.

The benzotriazole-based ultraviolet absorbing agents can be, for example, 2-(2-hydroxy-5-methylphenyl)-2H-benzotriazole, 5-chloro-2-(3,5-di-t-butyl-2-hydroxyphenyl)-2H-benzotriazole, 2-(3-t-butyl-2-hydroxy-5-methylphenyl)-5-chloro-2H-benzotriazole, 2-(3,5-di-t-pentyl-2-hydroxyphenyl)-2H-benzotriazole, 2-(3,5-di-t-butyl-2-hydroxyphenyl)-2H-benzotriazole, 2-(2H-benzotriazole-2-yl)-4-methyl-6-(3,4,5,6-tetrahydrophthalimidylmethyl) phenol, 2-(2-hydroxy-5-t-octylphenyl)-2H-benzotriazole, etc.

Any of 2-(1-aryl alkylidene)malonates are generally used as the malonic ester-based ultraviolet absorbing agent and, for example, dimethyl 2-(p-methoxybenzylidene)malonate, or the like, is usable.

Any of 2-alkoxy-2'-alkyloxalic anilides is generally used as the oxalic anilide-based ultraviolet absorbing agent, and, for example, 2-ethoxy-2'-ethyloxalic anilide, or the like, is usable.

Preferably, the use amount of the ultraviolet absorbing agent is 5 to 1,000 ppm by weight to the polymer composition contained in the polymer composition to be obtained.

In the raw material monomer tank 1, the above-described raw material monomer (of one type or as a mixture of two or more types thereof) is properly blended (together with the other component(s) such as the chain transfer agent when necessary). In the raw material monomer tank 2, the above-described raw material monomer (of one type or as a mixture of two or more types thereof) is properly blended (together with the other component(s) such as the chain transfer agent when necessary). The raw material monomer tank 2 may store the raw material monomer alone, or may include the other component(s) such as the chain transfer agent in addition to the raw material monomer.

As to the raw material monomer tank 2 and the replenishing line 15*b*, the temperature of the raw material monomer stored in the raw material monomer tank 2 and/or the temperature of the raw material monomer flowing through the replenishing line 15*b* are/is regulated by the temperature regulating means such as, for example, the jacket covering at least partially the raw material monomer tank 2, the jacket covering at least partially the replenishing line 15*b*, the heater/cooler replacing a part of the replenishing line 15*b*, and the trace pipe through which a cooling/heating medium passes. When the raw material monomer tank 2 has the jacket provided thereon as the temperature regulating means, preferably, the raw material monomer is stirred in the raw material monomer tank 2 based on the point that the temperature can more efficiently be regulated. The degree of the temperature regulation is properly adjusted corresponding to the temperature desired for the raw material monomer to be supplied from the replenishing line 15b to the second reactor 20. In the polymerization initiator tank 3, the above-described polymerization initiator is properly blended with the raw material monomer when necessary (together with the other component(s) such as the chain transfer agent when necessary). The polymerization initiator tank 3 may store the polymerization initiator alone or in the form of the mixture of the raw material monomer and the polymerization initiator (that may further include the other component(s) such as the chain transfer agent when necessary). When the polymerization initiator tank 17 is used, in the polymerization initiator tank 17, the above-described polymerization initiator can properly be blended with the raw material monomer when necessary (together with the other component(s) such as the chain transfer agent when necessary). The polymerization initiator tank 17 may store the polymerization initiator alone or in the form of the mixture of the raw material monomer and the polymerization initiator (that may further include the other component(s) such as the chain transfer agent when necessary). In the case where the polymerization initiator tank 17 is connected to the third supply port 21c of the second reactor 20 through the pump 19, when the polymerization initiator is stored alone, the polymerization initiator alone is supplied to the reactor 20, and therefore, concern arises that the polymerization reaction may locally advance in the reactor 20. On the contrary, when the raw material monomer and the polymerization initiator are stored in the form of the mixture thereof, the polymerization initiator is mixed with a part of the raw material monomer in advance, and the concern can be, therefore, avoided. To mix the polymerization initiator and the raw material monomer with each other, the polymerization initiator tank 17 may be connected to the replenishing line 15b supplying the raw material monomer, that is connected to the second supply port 21b of the second reactor 20 through the pump 19. When the polymerization initiator tank 17 is used, preferably, the temperature of the polymerization initiator or the mixture of the raw material monomer and the polymerization initiator (that may further include the other component(s) such as the chain transfer agent when necessary) is regulated by the temperature regulating means such as, for example, a jacket covering at least partially the polymerization initiator tank 17, a heater/cooler replacing a part of the line connecting the polymerization initiator tank 17 to the first supply port 21a, the second supply port 21b, or the third supply port 21c of the second reactor 20, or a trace pipe through which a cooling/heating medium passes. When the polymerization initiator tank 17 has the jacket provided thereon as the temperature regulating means, preferably, the polymerization initiator or the mixture of the raw material monomer and the polymerization initiator (that may further include the other component(s) such as the chain transfer agent when necessary) is stirred in the polymerization initiator tank 17 based on the point that the temperature can more efficiently be regulated.

First Polymerization Step

The raw material monomer and the polymerization initiator are continuously supplied from the raw material monomer tank 1 and the polymerization initiator tank 3 that are the supply sources of the raw material monomer and the polymerization initiator to the first reactor 10 through the supply port 11a. For example, the raw material monomer is continuously supplied from the raw material monomer tank 1 by the pump 5, and the polymerization initiator (preferably, the mixture of the raw material monomer and the polymerization initiator, also simply referred to as "polymerization initiator" herein) is continuously supplied from the polymerization initiator tank 3 by the pump 7, being merged together through the raw material supply line 9 into the first reactor 10 through the supply port 11a. The polymerization initiator may also be supplied from the polymerization initiator tank 3 by the pump 7 to the first reactor 10 through the other supply port 11c as indicated by a dotted line in FIG. 1.

In supplying the polymerization initiator to the first reactor 10, when the mixture of the raw material monomer and the polymerization initiator is blended in the polymerization initiator tank 3, and the mixture is supplied therefrom, preferably, ratios A:B are adjusted to be in a range from 80:20 to 98:2 as the supply flow rate "A" (kg/h) of the raw material monomer from the raw material monomer tank 1 and the supply flow rate "B" (kg/h) of the mixture of the raw material monomer and the polymerization initiator (whose content proportion of the polymerization initiator is 0.002 to 10% by weight) from the polymerization initiator tank 3.

Though the temperatures of the raw material monomer and the polymerization initiator supplied to the first reactor 10 are each not especially limited, the temperatures are factors that may degrade the thermal balance in the reactor to fluctuate the polymerization temperature, and, preferably, the temperatures are properly adjusted by the heater/cooler (not depicted) before their supply to the reactor 10.

The raw material monomer and the polymerization initiator supplied to the first reactor 10 as described above are subjected to continuous polymerization, preferably, continuous bulk polymerization in this embodiment (in other words, polymerization with no solvent). This first polymerization step only has to advance the polymerization reaction partway, and the intermediate composition is continuously taken out from the effluent port 11b of the first reactor 10. The polymerization reaction may completely be conducted in the first reactor 10.

Preferably, at the first polymerization step, the continuous polymerization may be executed in a state where the reactor is filled with the reaction mixture and substantially no gas phase is present therein (hereinafter, referred to as "fully filled condition"). This is especially suitable for the continuous bulk polymerization. The use of the fully filled condition can in advance prevent such problems from arising as that a gel adheres to and grows on the inner wall face of the reactor, and that the gel is contaminated into the reaction mixture to degrade the quality of the polymer composition finally obtained. Moreover, the use of the fully filled condition enables all the inner volume of the reactor to be used as a reaction space, and high production efficiency can thereby be obtained.

An advantageous fully filled condition can easily be realized only by continuously supplying to and taking out from the first reactor 10 by positioning the effluent port 11b of the first reactor 10 at the top of the reactor as in this embodiment. Positioning of the effluent port at the top of the reactor is especially suitable for the continuous polymerization of the methacrylic ester monomer.

At the first polymerization step, the continuous polymerization may be conducted under the adiabatic condition (the condition where substantially no heat is transferred to and from the outside of the reactor). This is especially suitable for the continuous bulk polymerization. The adiabatic condition can prevent in advance such problems from arising as that a gel adheres to and grows on the inner wall face of the reactor, and that this gel is contaminated into the reaction mixture to degrade the quality of the polymer composition finally obtained. Moreover, the adiabatic condition can stabilize the polymerization reaction, and can provide a self-regulating property to suppress any runaway reaction.

The adiabatic condition can be realized by causing the temperature in the first reactor 10 and the temperature of the outer wall face thereof to be substantially equal to each other. For example, this condition can be realized, by using of the above-described control means (not depicted), by adjusting the supply amounts of the raw material monomer and the polymerization initiator to the first reactor 10 by operating the pumps 5 and 7 such that the temperature of the outer wall face of the first reactor 10 set for the jacket (the temperature regulating means) 13 and the temperature in the first reactor 10 detected by the temperature sensor (the temperature detecting means) $T_1$ are equal to each other. Herein, it is disadvantageous to set the temperature of the outer wall face of the reactor to excessively be higher than the temperature in the reactor, because an amount of extra heat is added to the inside of the reactor. A smaller difference is more advantageous in the temperatures between the inside of the reactor and the outer wall face of the reactor and, for example, preferably, the temperature difference is adjusted to be within a range of about ±5° C.

The polymerization heat and the stirring heat generated in the first reactor 10 are generally carried away with the intermediate composition when the intermediate composition is taken out from the first reactor 10. The amount of the heat carried away by the intermediate composition is determined based on the flow rate and the specific heat of the intermediate composition, and the temperature of the polymerization reaction.

The temperature of the continuous polymerization at the first polymerization step is understood as the temperature in the first reactor 10 (detected by the temperature sensor $T_1$). The first polymerization step is conducted at, for example, a temperature in a range from 120 to 150° C., and at, preferably, a temperature in a range of 130 to 150° C. It should be noted, however, that the temperature in the reactor may be varied depending on various conditions until a static state is established therein.

The pressure for the continuous polymerization at the first polymerization step is understood as the pressure in the first reactor 10. This pressure is set to be a pressure equal to or higher than the vapor pressure of the raw material monomer at the temperature in the reactor to avoid generation of any gas of the raw material monomer in the reactor, and generally is about 1.0 to 2.0 MPa as a gauge pressure.

A time period for the components to be subjected to the continuous polymerization at the first polymerization step is understood as an average residence time in the first reactor 10. The average residence time to be in the first reactor 10 may be set corresponding to the production efficiency of the polymer in the intermediate composition, etc., and is not especially limited, but, is, for example, from 15 minutes to 6 hours. The average residence time to be in the first reactor 10 can be adjusted by varying the supply amount (the supply flow rate) of the raw material monomer, etc., to the first reactor 10 by using of the pumps 5 and 7 while the average residence time significantly depends on the inner volume of the first reactor 10, and it is, therefore, important as described later how large the inner volume of the first reactor 10 and the inner volume of the second reactor 20 are designed.

In this manner, the intermediate composition is continuously taken out from the effluent port 11b of the first reactor 10. The resulting intermediate composition includes the generated polymer and the unreacted raw material monomer(s), and may further include the unreacted polymerization initiator(s), decomposed substances of the polymerization initiator(s), etc.

Although not limiting this embodiment, preferably, the polymerization conversion of the intermediate composition is 5 to 80% by weight. The polymerization conversion of the intermediate composition substantially corresponds to the polymer content proportion of the intermediate composition.

Intermediate Cooling Step

The intermediate composition obtained as described above is continuously taken out from the effluent port 11b of the first reactor 10 and flows through the connection line 15a. The intermediate composition flowing through the connection line 15a may continuously be supplied from the first supply port 21a of the second reactor 20 into the second reactor 20.

The temperature of the intermediate composition flowing through the connection line 15a is not especially limited, is, for example, 120 to 180° C., is, preferably, 130 to 180° C., and is, more preferably, 135 to 175° C. This temperature may be adjusted by cooling the intermediate composition to be at a temperature of, for example, 50 to 120° C., preferably, 60 to 110° C., and, more preferably, 70 to 110° C. by concurrently using of the cooing means such as the jacket 16 or the cooler 40 as in the embodiment illustrated in FIG. 2 or FIG. 3.

When the polymerization initiator tank 17 is connected to the connection line 15a through the pump 19, the intermediate composition can be cooled also by adding, to the intermediate composition, the polymerization initiator, or the mixture of the raw material monomer and the polymerization initiator (that may further include the other component(s) such as the chain transfer agent when necessary) supplied from the polymerization initiator tank 17. The polymerization initiator, or the mixture of the raw material monomer and the polymerization initiator is usable, that is at a temperature of, for example, −40 to 30° C., and, preferably, −40 to 10° C. at the time point of the supply thereof to the connection line 15a.

When the cooling means is concurrently used as in the embodiment illustrated in FIG. 2 or FIG. 3, the intermediate composition may continuously be cooled between the effluent port 11b of the first reactor 10 and the supply port 21a of the second reactor 20 by the jacket 16 or the cooler 40, that is the cooling means provided on the connection line 15a. The regulation of the cooling and the temperature may be conducted such that the temperature of the intermediate composition at the supply port 21a of the second reactor 20 is lower by, for example, 5 to 80° C. than the temperature of the intermediate composition at the effluent port 11b of the first reactor 10.

Though not essential to the present invention, preferably, a mixing means is provided in the connection line 15a. The provision of the mixing means causes the intermediate composition flowing through the connection line 15a to be homogeneously mixed, therefore causes the temperature distribution thereof to tend to be homogenized, and enables suppression of any occlusion of the connection line 15a by the intermediate composition. When the mixing means is provided in the connection line 15a, a static mixer or a dynamic mixer may be provided in the connection line 15a, or the cooler 40 including both of the mixing means and the cooling means may be provided in the connection line 15a.

The degree of the cooling may vary depending on the difference between the temperature in the first reactor 10 and the temperature in the second reactor 20, etc., as in, for example, the preferred exemplary control as described above, and may be adjusted corresponding to a desired polymerization temperature and a desired polymerization conversion in the second reactor 20, and, for example, the adjustment may be conducted such that the temperature of the intermediate composition in the supply port 21a of the second reactor 20 is, for example, lower by 5 to 80° C. than the temperature of the intermediate composition in the effluent port 11b of the first reactor 10.

Supply Step of New Monomer to Second Reactor 20

In the present invention, the raw material monomer is newly (additionally) supplied to the second reactor 20, thereby, the intermediate composition supplied from the connection line 15a is further cooled and/or the temperature of the intermediate composition is further regulated to successfully conduct the continuous polymerization in the second reactor 20, and the polymer composition to obtain a high quality resin composition can thereby be efficiently prepared.

For example, the new raw material monomer (or the mixture of the raw material monomer and the other component(s) such as the chain transfer agent when necessary) is continuously supplied that is concurrently cooled and/or whose temperature is concurrently regulated when necessary and, preferably, that is concurrently cooled, from the raw material monomer tank 2 to the second reactor 20 through the replenishing line 15b. For example, the raw material monomer (or the mixture of the raw material monomer and the other component(s) such as the chain transfer agent when necessary) is continuously supplied whose temperature is concurrently regulated when necessary, and, preferably, that is concurrently cooled, from the raw material monomer tank 2 to the second reactor 20 through the replenishing line 15b by the pump 6.

Ratio (N:C) of the flow rate "N" (kg/h) of the intermediate composition taken out from the effluent port 11b of the first reactor 10 to the connection line 15a (the original intermediate composition) to the flow rate "C" (kg/h) of the raw material monomer supplied from the replenishing line 15b to the second reactor 20 is set to be within a range from 0.995:0.005 to 0.5:0.5, to be, preferably, within a range from 0.9:0.1 to 0.5:0.5, and to be, more preferably, within a range from 0.8:0.2 to 0.6:0.4. When the flow rate C of the raw material monomer is excessively small, no sufficient cooling effect on the intermediate composition may be achieved. When the flow rate C of the raw material monomer is excessively large, the proportion of the unreacted raw material monomer in the polymer composition taken out from the second reactor 20 becomes high, and this tends to easily impose a load on the recovery system, and the residence time in the second reactor 20 becomes short. The amount of polymerization initiator is, therefore, increased that is necessary for achieving a desired productivity, and thermal stability of the obtained polymer may be degraded.

In the present invention, the intermediate composition can be cooled in the second reactor 20 by supplying, to the second reactor 20, the raw material monomer at a temperature lower than that of the intermediate composition (the original intermediate composition) taken out from the effluent port 11b of the first reactor 10. In other words, the temperature of the intermediate composition supplied to the second reactor 20 may be, in the second reactor 20, lower than the temperature of the original intermediate composition (that is, the intermediate composition taken out from the first reactor 10 or the intermediate composition flowing through the connection line 15a). This cooling may be conducted such that the temperature of the intermediate composition (or the polymerization reaction mixture) in the second reactor 20 is lower by, for example, 5 to 80° C. than the temperature of the intermediate composition at the effluent port 11b of the first reactor 10.

Such a raw material monomer is usable as the raw material monomer supplied from the raw material monomer tank 2 through the pump 6, as the one whose temperature is, for example, −40 to 30° C., and is, preferably, −40 to 10° C. at the time point of the supply thereof from the replenishing line 15b to the second supply port 21b of the second reactor 20. When this temperature is excessively low, the raw material monomer may coagulate depending on the type thereof to occlude the replenishing line 15b. On the other hand, when this temperature is excessively high, no sufficient cooling effect on the intermediate composition may be achieved in the second reactor 20.

Though the temperature of the raw material monomer supplied from the raw material monomer tank 2 to the second reactor 20 is not especially limited, preferably, this temperature is properly regulated by the heater/cooler before the supply thereof to the second reactor 20 because this temperature is a factor that may degrade the thermal balance in the reactor 20 to fluctuate the polymerization temperature in the reactor 20.

Second Polymerization Step

A second polymerization step may be conducted in series with and after the first polymerization step.

The intermediate composition cooled during the passage thereof through the connection line 15a when necessary as described above is supplied to the second reactor 20 through the first supply port 21a. The raw material monomer (and the other component(s) such as the chain transfer agent when necessary) may be supplied, that may be cooled to be at a temperature lower than that of the intermediate composition when necessary, from the raw material monomer tank 2 through the pump 6 to the second reactor 20 from the second supply port 21b, through the replenishing line 15b. The intermediate composition and the additional raw material monomer supplied to the second reactor 20 as described above are further subjected to a continuous polymerization, preferably, a continuous bulk polymerization in this embodiment in the second reactor 20. This second polymerization step can cause the polymerization reaction to advance to achieve the desired polymerization conversion, and the polymer composition (or a polymerization syrup) can be continuously taken out from the effluent port 21d of the second reactor 20.

The second polymerization step will be described below mainly for the points different from the first polymerization step, and explanations similar to those for the first polymerization step will apply thereto unless otherwise especially explained.

At the second polymerization step, the raw material monomer (and the other component(s) such as the chain transfer agent when necessary) is supplied whose temperature is concurrently regulated, and, preferably, that is concurrently cooled, when necessary, from the raw material monomer tank 2 through the pump 6 to the second reactor 20 through the replenishing line 15b connected to the second supply port 21b of the second reactor 20. The above-described separate supply of the new raw material monomer to the second reactor 20 enables the temperature of the intermediate composition supplied from the first supply port 21a to the second reactor 20 to be regulated, and, preferably, enables this intermediate composition to be cooled, and a polymerization composition to provide a high quality resin composition can be obtained. The temperature of the monomer supplied to the second reactor 20 is, preferably, −40 to 30° C. and is, more preferably, −40 to 10° C. at the time point of the supply thereof to the second reactor 20, and is desirably lower than the temperature of the intermediate composition flowing through the connection line 15a, especially, the intermediate composition immediately before the first supply port 21a of the second reactor 20 by 90 to 190° C. and, preferably, by 110 to 180° C. The temperature of the second reactor can efficiently be decreased due to the fact that the temperature of the monomer supplied to the second reactor 20 is lower than the temperature of the intermediate composition flowing through the connection line 15a, and effects can be achieved such as that the polymerization conversion of the resulting polymerization composition can be increased.

Though not essential to the present invention, preferably, the polymerization initiator tank 17 and the pump 19 are used. When the polymerization initiator tank 17 and the pump 19 are used, a new polymerization initiator (preferably, the mixture of the raw material monomer and the polymerization initiator) can be supplied from the polymerization initiator tank 17 by the pump 19 to the second reactor 20 through the connection line 15a from the first supply port 21a, or from the second supply port 21b through the replenishing line 15b, or from the third supply port 21c, and the new polymerization initiator is, thereby, added to the intermediate composition.

The intermediate composition taken out from the first reactor 10 is cooled before being supplied to the second reactor 20 by using of the jacket 16 or the cooler 40 that may be provided on the connection line 15a as a cooling means, and, even when any polymerization heat is generated in the second reactor 20, the continuous polymerization can, thereby, be executed avoiding generation of any temperature inhomogeneous state in the second reactor 20, and a high polymerization conversion can be achieved, that is, the productivity of the polymer can be increased, suppressing the temperature in the second reactor 20 to be low. As a result, a polymer composition excellent in the thermal stability and the heat resistance can efficiently be produced. The temperature of the intermediate composition during its supply to the second reactor 20 is maintained to be constant by adjusting this temperature by using of the jacket 16 or the cooler 40 that may be provided on the connection line 15a as a cooling means, and the continuous polymerization can thereby be more stably conducted at the second polymerization step.

In the supply of the polymerization initiator to the second reactor 20, when the mixture of the raw material monomer and the polymerization initiator is blended in the polymerization initiator tanks 3 and 17, and is supplied therefrom, with respect to a supply flow rate "A" (kg/h) of the raw material monomer from the raw material monomer tank 1, a supply flow rate "C" (kg/h) of the raw material monomer from the replenishing line 15b to the second reactor 20, a supply flow rate "$B_1$" (kg/h) of the mixture of the raw material monomer and the polymerization initiator (whose content proportion of the polymerization initiator is 0.002 to 10% by weight) from the polymerization initiator tank 3, and a supply flow rate $B_2$ (kg/h) of the mixture of the raw material monomer and the polymerization initiator (whose content proportion of the polymerization initiator is 0.002 to 10% by weight) from the polymerization initiator tank 17, preferably, adjustment is conducted such that a ratio $(A+B_1+C):B_2$ is within a range from 80:20 to 98:2, and a ratio $B_1:B_2$ is within a range from 10:90 to 90:10.

A ratio (A:C) of the supply flow rate "A" (kg/h) of the raw material monomer from the raw material monomer tank 1 to the supply flow rate "C" (kg/h) of the raw material monomer from the replenishing line 15b to the second reactor 20 desirably are, for example, within a range from 0.95:0.05 to 0.5: 0.5, are, preferably, within a range from 0.85:0.15 to 0.5:0.5, and are, more preferably, within a range from 0.75:0.25 to 0.55:0.45.

At the second polymerization step, the continuous polymerization may also be conducted under the fully filled condition. This is especially suitable for the continuous bulk polymerization. The use of the fully filled condition can prevent in advance such problems from arising as that a gel adheres to and grows on the inner wall face of the reactor and that this gel is contaminated into the reaction mixture to degrade the quality of the polymer composition finally obtained. Moreover, the use of the fully filled condition also enables all the inner volume of the reactor to be used as a reaction space, and a high production efficiency can thereby be achieved.

The fully filled condition can easily be realized only by continuously conducting the supply to and the taking out from the second reactor 20 by positioning the effluent port 21d of the second reactor 20 at the top of the reactor as in this embodiment. Positioning of the effluent port at the top of the reactor is especially suitable for continuously polymerizing a methacrylic ester monomer.

At the second polymerization step, preferably, the continuous polymerization may be conducted under the adiabatic condition. This is especially suitable for the continuous bulk polymerization. The adiabatic condition can prevent in advance the problems from arising such as that a gel adheres to and grows on the inner wall face of the reactor, and that this gel is contaminated into the reaction mixture to degrade the quality of the polymer composition finally obtained. The adiabatic condition can stabilize the polymerization reaction, and can provide a self-regulating property to suppress any runaway reaction.

The adiabatic condition can be realized by causing the temperature in the second reactor 20 and the temperature of the outer wall face thereof to be substantially equal to each other. For example, this condition can be realized, by using of the above-described control means (not depicted), by adjusting the supply amounts of the raw material monomer and the polymerization initiator to the second reactor 20 by operating the pumps 5 to 7, and the pump 19 when the pump 19 is present, such that the temperature of the outer wall face of the second reactor 20 set for the jacket (the temperature regulating means) 23 and the temperature in the second reactor 20 detected by the temperature sensor (the temperature detecting means) $T_2$ are equal to each other. Herein, it is disadvantageous to set the temperature of the outer wall face of the reactor to be excessively higher than the temperature in the reactor, because an amount of extra heat is added to the inside of the reactor. A smaller difference is more advantageous in the temperature between the inside of the reactor and the outer wall face of the reactor. For example, preferably, the temperature difference is adjusted to be within a range of about ±5° C.

The polymerization heat and the stirring heat generated in the second reactor 20 are generally carried away with the polymer composition when the polymer composition is taken out from the second reactor 20. The amount of the heat carried away by the polymer composition is determined by the flow rate and the specific heat of the polymer composition, and the temperature of the polymerization reaction.

The temperature of the continuous polymerization at the second polymerization step is understood as the temperature in the second reactor 20. The second polymerization step is conducted at, for example, a temperature in a range from 120 to 150° C. and at, preferably, a temperature in a range from 130 to 150° C. Preferably, the temperature of the continuous polymerization at the second polymerization step is different from the temperature of the continuous polymerization at the first polymerization step by 10° C. or less. At the second polymerization step, though the temperature may be increased by the polymerization heat generated by the polymerization reaction, the difference can be reduced between the temperature of the second polymerization step and the temperature of the first polymerization step by conducting intermediate cooling by using of the connection line 15a, and by adding the raw material monomer that is cooled when necessary from the replenishing line 15b. As a result, the thermal stability and the heat resistance are improved with being compared to the case where the polymerization is conducted at a lower temperature in the first reactor and the polymerization is thereafter conducted at a high temperature in the second reactor.

The pressure for the continuous polymerization at the second polymerization step is understood as the pressure in the second reactor 20. This pressure is generally about 1.0 to 2.0 MPa, as a gauge pressure, and may be equal or similar to the pressure for the first polymerization step.

A time period during which the components are subjected to the continuous polymerization at the second polymerization step is understood as an average residence time in the second reactor 20. The average residence time in the second reactor 20 may be set corresponding to the production efficiency of the polymer in the polymer composition, etc., and is not especially limited, while the average residence time is, for example, 15 minutes to 6 hours. The ratio of the average residence time of the second reactor 20 to the average residence time of the first reactor 10 is, preferably, 9/1 to 1/9, and is, more preferably, 8/2 to 2/8. The average residence time at the second polymerization step may be equal to the average residence time at the first polymerization step, but is, preferably, different therefrom. The average residence time in the second reactor 20 can be regulated by varying the supply amounts (the supply flow rates) of the raw material monomer, etc., to the second reactor 20 by using of the pumps 5 to 7 and the pump 19 when the pump 19 is present, while the average residence time in the second reactor 20 significantly depends on the inner volume of the second reactor 20, and it is therefore important as described later how large the inner volume of the first reactor 10 and the inner volume of the second reactor 20 are designed.

As described above, the polymer composition may be continuously taken out from the effluent port 21d of the second reactor 20. The resulting polymer composition may include the produced polymer, and may further include the unreacted raw material monomer(s), the unreacted polymerization initiator(s), the decomposed substances of the polymerization initiator(s), etc.

Though the polymerization conversion of the polymer composition does not limit this embodiment, the polymerization conversion is, for example, 30 to 90% by weight. Herein, the polymerization conversion of the polymer composition substantially corresponds to the content proportion of the polymer in the polymer composition. The productivity of the polymer becomes higher as the polymerization conversion is higher while the viscosity is increased of those from the intermediate composition to the polymer composition resulting in necessity for significant power for the stirring. The productivity of the polymer becomes lower as the polymerization conversion is lower, and the load becomes significant to recover the unreacted raw material monomer. Preferably, a proper polymerization conversion is therefore set as a target or a guide.

According to this embodiment, addition of the raw material monomer is conducted, whose temperature is regulated by, preferably, cooling, from the replenishing line 15b, and the cooling means of the connection line is controlled when the cooling means is concurrently used, in order to cause the temperature in the connection line in the vicinity of the supply port of the second reactor to be lower than the temperature in the first reactor detected by the temperature detecting means of the first reactor such that the polymerization temperature in the second reactor 20 can be suppressed to be low with achieving a desired polymerization conversion. The intermediate composition can thereby be highly efficiently cooled and a polymer composition excellent in the thermal stability, and the heat resistance can be obtained with excellent productivity.

Generally, a higher polymerization temperature tends to provide a lower syndiotacticity of the obtained polymer, and tends to provide a lower heat resistance of a resin composition finally obtained. Preferably, the polymerization is therefore caused to take place at a low temperature to obtain a resin composition having a high heat resistance. When the continuous polymerization is conducted only in one stage at a lower temperature using the traditional continuous polymerization apparatus (Patent Literatures 1 and 2), a long time period is however necessary to achieve a desired polymerization conversion, and a larger reactor, and, as a result, a larger space are therefore necessary to realize a long average residence time. The above continuous polymerization is therefore inefficient. When the average residence time is longer than necessary, the production amount of the oligomers such as a dimer and a trimer is increased, and the heat resistance of the resin composition obtained from the polymer composition may be degraded.

In addition, the amount of the polymerization initiator may be set corresponding to other conditions such as the polymerization temperature, the desired polymerization conversion, the average residence time, etc. A larger amount of polymerization initiator is necessary for achieving the desired polymerization conversion as the polymerization temperature is lower and as the average residence time is shorter while the amount of polymerization terminal ends each including an unstable unsaturated bond (terminal polymers) remaining in the polymerization composition is increased as the amount of the polymerization initiator is increased. The thermal stability of the resin composition finally obtained therefore tends to be degraded. When the polymerization temperature is excessively high, a large amount of polymerization terminal ends each including an unsaturated bond due to the polymerization initiator (terminal polymers) is produced in the polymerization composition, and therefore the thermal stability of the resin composition finally obtained tends to be degraded.

In this embodiment, for example, the continuous polymerization can be conducted at a temperature in the predetermined range (for example, 120 to 150° C.) at the first polymerization step, and the continuous polymerization can thereafter be further conducted at the temperature in the same or similar range as that for the first polymerization step (for example, 120 to 150° C.), at the second polymerization step. For example, the cooling step is conducted in the connection line between the first reactor and the second reactor, and the new raw material monomer and the new polymerization initiator are added into the second reactor. The adiabatic polymerization can thereby be conducted under conditions reducing the difference between the temperature of the continuous polymerization at the first polymerization step and the temperature of the continuous polymerization at the second polymerization step. As a result, the continuous polymerization can efficiently be conducted in a smaller space with being compared to the case where the continuous polymerization is conducted in one stage at a lower temperature, and the polymer composition can be obtained that is suitable for obtaining a resin composition that is excellent in heat resistance and that includes fewer impurities such as a gel generated in the adiabatic polymerization, with being compared to the case where the continuous polymerization is conducted in the one stage at a high temperature.

In this embodiment, for example, the time period during which the components are subjected to the continuous polymerization at the first polymerization step can be caused to differ from the time period during which the components are subjected to the continuous polymerization at the second polymerization step. For example, the average residence time of the first reactor and the average residence time of the second reactor can be caused to be different from each other by designing the inner volume of the first reactor and the inner volume of the second reactor to be different from each other. The average residence time of the first reactor and the average residence time of the second reactor can also be caused to be different from each other also by adding the new raw material monomer into and adding the new polymerization initiator together with the raw material monomer into the second reactor. When the average residence time is increased, the amount of the polymerization initiator supplied into the reactor can further be reduced. The thermal stability of the overall resin composition can therefore be adjusted, and a polymer composition can be obtained that is suitable for obtaining the resin composition with a high thermal stability by controlling the residence time and the polymerization conversion in each of the first reactor and the second reactor.

How the polymerization reaction conditions are set for each of the first polymerization step and the second polymerization step may be different between the two steps corresponding to the polymer to be produced, the raw material monomer and the polymerization initiator to be used, the desired heat resistance, the desired thermal stability, the desired production efficiency, etc.

Devolatilization Step

As described above, the polymer composition (the polymerization syrup) taken out from the effluent port 21*d* of the second reactor 20 may include the unreacted raw material monomer, the polymerization initiator, etc., in addition to the produced polymer. Though the polymer composition does not limit this embodiment, preferably, the polymer composition is subjected to devolatilization or the like to separate and recover the raw material monomer.

For example, the polymer composition taken out from the effluent port 21*d* is transferred to the preheater 31 through the effluent line 25. The polymer composition is supplied by using of the preheater 31 with a part or all of an amount of heat necessary for volatilizing the volatile components that mainly include the unreacted raw material monomer. The polymer composition may thereafter be transferred to the devolatilizing extruder 33 through the pressure adjusting valve (not depicted), and the volatile components may at least partially be removed by using of the devolatilizing extruder. A residual extruded object may be shaped into pellets and discharged from the discharge line 35. Preferably, a resin composition including a methacrylic ester polymer may thereby be produced in the form of the pellet.

A method described in Japanese Patent Publication No. 4-48802 is advantageously employed as a method of transferring the above-described polymer composition. Any of methods described in, for example, Japanese Laid-Open Patent Publication No. 3-49925, Japanese Patent Publication Nos. 51-29914, 52-17555, and 1-53682, and Japanese Laid-Open Patent Publication No. 62-89710, or the like, is advantageously employed as a method using a devolatilizing extruder.

During or after devolatilization of the polymer composition by using of the above-described devolatilizing extruder, the polymer composition or the extruded object thereof can be added with a lubricant(s) such as a higher alcohol(s) and a higher fatty acid ester(s); an ultraviolet absorbing agent, a thermal stabilizing agent, a coloring agent, an antistatic agent, etc., to include that agent(s) into the resin composition when necessary.

The volatile components removed by using of the devolatilizing extruder 33 include the unreacted raw material monomer as the main component thereof, and also include impurities such as the impurities originally included in the raw material monomer, additive(s) used when necessary, volatile by-product(s) generated in the polymerization steps, oligomers such as a dimer and a trimer, and decomposed substances of the polymerization initiator. Generally, when the amount of the impurities increases, the obtained resin composition becomes colored, and this increase is disadvantageous. The volatile components removed by using of the devolatilizing extruder 33 (that include the unreacted raw material monomer as the main component thereof and also include above impurities, etc.) may be caused to pass through a monomer recovery column (not depicted), and may be treated by means of distillation, adsorption, etc., in the monomer recovery column to remove the impurities from the above-described volatile components. The unreacted raw material monomer can thereby be recovered with high purity, and can be advantageously reused as the raw material monomer for the polymerization. For example, in the monomer recovery column, the unreacted raw material monomer may be recovered with high purity as a distillate liquid from the top of the monomer recovery column by using of a continuous distillation, and may be transferred to and recycled in the raw material monomer tank 1, 2 after being stored in the recovery tank 37, or may be transferred to and recycled in the raw material monomer tank 1, 2 without being stored in the recovery tank 37. On the other hand, the impurities removed in the monomer recovery column may be discarded as wastes.

To prevent the recovered raw material monomer from taking place the polymerization reaction in the recovery tank 37 and the raw material monomer tank 1, 2, preferably, a polymerization inhibitor is caused to be present in the recovery tank 37 or the raw material monomer tank 1, 2 at a proportion of, for example, 2 to 8 ppm by weight to the raw material monomer, and, more preferably, the oxygen concentration in the gas phase in each of the recovery tank 37 and the raw material monomer tanks 1, 2 is set to be 2 to 8% by volume. When the recovered raw material monomer is desired to be stored in the recovery tank 37 for a long time, the recovered raw material monomer is desirably stored at a low temperature of, for example, 0 to 5° C.

In this embodiment, the continuous bulk polymerization apparatus has been described whose first reactor and second reactor are both used to conduct the continuous bulk polymerization. The continuous polymerization apparatus of the present invention is, however, not limited thereto, and one or both of the first reactor and the second reactor may be used to conduct the continuous solution polymerization. In such aspect, because a solvent is used for the solution polymerization, the continuous polymerization apparatus further includes, in addition to the same or similar configurations as those of the continuous polymerization apparatus described above with reference to FIGS. 1 to 3, a solvent tank, and a supply line and a pump (a supply means) associated with the solvent tank, to supply the solvent to a predetermined reactor that conducts the solution polymerization. The solvent tank, and the supply line and the pump (the supply means) associated with the solvent tank are not especially limited, and those same or similar to the traditionally used ones are usable. The solvent may be supplied to the predetermined reactor used to conduct the solution polymerization after being mixed with the raw material monomer and/or the polymerization initiator, or may be supplied directly to the predetermined reactor used to conduct the solution polymerization. In the predetermined reactor, a polymerization step may be conducted similarly to the polymerization step described above with reference to FIGS. 1 to 3 except the fact that the solvent is used in the polymerization reaction. The solvent is properly set corresponding to the raw material monomer, or the like, of the solution polymerization reaction, and is not especially limited, and can be, for example, toluene, xylene, ethylbenzene, methylisobutyl ketone, methyl alcohol, ethyl alcohol, octane, decane, cyclohexane, decalin, butyl acetate, and pentyl acetate, etc. A ratio D:E of the supply flow rate "D" (kg/h) of the raw material monomer to the predetermined reactor used to conduct the solution polymerization to the supply flow rate "E" (kg/h) of the solvent to the predetermined reactor is, for example, 70:30 to 95:5, and are, preferably, 80:20 to 90:10, while this ratio is not limited thereto.

The continuous polymerization apparatus and the production method of a polymer composition according to the present invention have been described above in detail through the embodiment of the present invention. According to the present invention, a novel continuous polymerization apparatus is provided, and, when this continuous polymerization apparatus is used, the polymerizations can be executed in at least two stages in series using at least the first reactor and the second reactor. The polymerization reaction conditions can therefore individually be set for each of the first polymerization step and the second polymerization step, such as, for example, the temperature, the time period (the average residence time), and the amount of the polymerization initiator (the rate of the polymerization initiator to the raw material monomer), etc. The raw material monomer can be added whose temperature is concurrently regulated when necessary, and, preferably, that is concurrently cooled when necessary, into the second reactor through the replenishing line corresponding to the desired polymerization temperature and the desired polymerization conversion in the second reactor, and, when the cooling means of the connection line is concurrently used, the cooling means is controlled such that the temperature in the connection line in the vicinity of the first supply port of the second reactor is lower than the temperature in the first reactor detected by the temperature detecting means of the first reactor. The syndiotacticity of the polymer contained in the resin composition finally obtained can thereby be controlled, and the polymer composition can more efficiently be produced that is suitable for obtaining the resin composition having high heat resistance and high thermal stability.

The present invention is not limited to the above-described embodiment, and various modifications can be made thereto. For example, the polymerization may be executed in three or more stages in series by using of three or more reactors. Preferably, the production method for the polymer composition according to the present invention is continuously conducted by using of the continuous polymerization apparatus according to the present invention while the production method may be conducted batch-wise.

The polymer composition obtained by using of the production method according to the present invention may advantageously be used as a material for a molded article, and the molded article obtained thereby has an advantage that the molded article has a high heat resistance and high thermal stability. For example, the molded article can be obtained by molding the polymer composition obtained by using of the production method according to the present invention (more specifically, the resin composition after the devolatilization) alone or together with an arbitrary other proper component(s) in an arbitrary molding method such as injection molding, or extrusion molding. The polymer composition obtained by using of the production method according to the present invention is advantageously usable for obtaining a molded article by injection molding, and the molded article can be obtained with suppressed generation of any silver streaks and good moldability. Especially, because the resin composition comprising a methacrylic ester polymer has excellent transparency, the molded article obtained from the resin composition by injection molding thereof has high transparency, suppressed occurrence of silver streaks, and good moldability, and is therefore advantageously utilized as a light guide plate used in a member of a backlight unit of each of various types of liquid crystal displays, etc., and as a vehicle member such as a rear lamp cover, a head lamp cover, a visor, or a meter panel.

The injection molding can be conducted by filling (injecting) into a mold having a predetermined thickness with at least the polymer composition obtained by using of the production method according to the present invention in a melted state, applying thereafter cooling thereto, and releasing the molded article that is molded from the mold. Specifically, for example, the polymer composition obtained by using of the production method according to the present invention (more specifically, the resin composition after the devolatilization) alone or together with an arbitrary other proper component(s) is supplied into a molding machine through a hopper, a screw is rotated to concurrently be retracted to measure the resin composition in a cylinder of the molding machine, the resin composition is melted in the cylinder, a mold (for example, a metal mold) is filled with the melted resin composition under a pressure, a pressure is maintained for a specific time period until the mold is sufficiently cooled, the mold is thereafter opened to take out the molded article therefrom, and the molded article can thereby be manufactured.

According to another aspect of the present invention, a molded article is also provided that is obtained from the polymer composition obtained by using of the production method according to the present invention. The conditions for manufacturing the molded article according to the present invention from the polymer composition (for example, for injection molding, the melting temperature of a molding material, a temperature of a mold at the time of the injection of the molding material thereinto, and a pressure to be maintained after the mold is filled with the resin composition, and the like) may properly be set, and are not especially limited.

INDUSTRIAL APPLICABILITY

The present invention is usable to produce a polymer composition suitable for obtaining a resin composition comprising a methacrylic ester polymer.

EXPLANATIONS OF LETTERS OR NUMBERS

1 raw material monomer tank (a supply source of a raw material monomer)
2 raw material monomer tank (another supply source of the raw material monomer)
3 polymerization initiator tank (a supply source of a polymerization initiator, and the raw material monomer when necessary)
5 to 7 pumps
9 raw material supply line
10 first reactor 11a supply port
11b effluent port
11c another supply port
13 jacket (a temperature regulating means)
14 stirrer
15a connection line
15b replenishing line
15c supply line
16 jacket (a cooling means)
17 polymerization initiator tank (a supply source of a new polymerization initiator, and a raw material monomer when necessary)
19 pump
20 second reactor
21a first supply port
21b second supply port
21c third supply port
21d effluent port
23 jacket (a temperature regulating means)
24 stirrer
25 effluent line
31 preheater
33 devolatilizing extruder
35 discharge line
37 recovery tank
40 cooler (a cooling means)
$T_1$, $T_2$ temperature sensor (a temperature detecting means)

The invention claimed is:

1. A continuous polymerization apparatus comprising at least a first reactor and a second reactor, wherein
each of the reactors comprises at least one supply port, an effluent port, and a temperature detecting means that detects a temperature in the reactor, wherein
the supply port of the first reactor is connected to supply sources of a raw material monomer and a polymerization initiator, wherein
the effluent port of the first reactor is connected to a first supply port of the second reactor by a connection line, wherein
a second supply port of the second reactor is connected to a replenishing line that supplies a new raw material monomer to the second reactor, and
wherein the apparatus further comprises a means for controlling flow rates to maintain a ratio of flow rate from the effluent port of the first reactor to the connection line to flow rate of raw material monomer from the replenishing line to the second reactor ranging from 0.995:0.005 to 0.5:0.5.

2. The continuous polymerization apparatus of claim 1, wherein
the replenishing line is connected to a supply source of a new raw material monomer, and wherein
at least one of the supply source and the replenishing line comprises a temperature regulating means.

3. The continuous polymerization apparatus of claim 1, wherein
the connection line comprises a cooling means.

4. The continuous polymerization apparatus of claim 1, wherein
the connection line comprises a mixing means between the effluent port of the first reactor and a first supply port of the second reactor.

5. The continuous polymerization apparatus of claim 1, wherein
each of the reactors is a tank type reactor, and wherein
the effluent port of each of the reactors is located at a top of the reactor.

6. The continuous polymerization apparatus of claim 1, wherein
each of the reactors is a complete mixing type reactor.

7. The continuous polymerization apparatus of claim 1, wherein
the first or the second supply port of the second reactor or a third supply port provided on the second reactor is connected to a supply source of a new polymerization initiator.

8. A production method of a polymer composition using the continuous polymerization apparatus of claim 1, wherein the production method comprises:
a first polymerization step of continuously supplying the raw material monomer and the polymerization initiator from the supply sources of the raw material monomer and the polymerization initiator to the first reactor through the supply port of the first reactor to subject the raw material monomer and the polymerization initiator to a continuous polymerization in the first reactor, and continuously taking out an intermediate composition obtained thereby from the effluent port of the first reactor, and
a second polymerization step of continuously supplying the intermediate composition to the second reactor through the first supply port of the second reactor, and supplying the new raw material monomer to the second reactor from the replenishing line connected to the second supply port of the second reactor for the intermediate composition and the new raw material to further be subjected to a continuous polymerization in the second reactor for the polymer composition obtained thereby to be continuously taken out from the effluent port of the second reactor; and
wherein the ratio of flow rate of the intermediate composition taken out from the effluent port of the first reactor to the connection line to flow rate of the new raw material monomer supplied from the replenishing line to the second reactor is within a range from 0.995:0.005 to 0.5:0.5.

9. The production method of a polymer composition of claim 8, wherein
a temperature of the new raw material monomer supplied from the replenishing line to the second reactor is within a range from −40 to 30° C.

10. The production method of a polymer composition of claim 8, wherein
a temperature in the first reactor detected by the temperature detecting means of the first reactor and a temperature in the second reactor detected by the temperature detecting means of the second reactor are within a range from 120 to 150° C., respectively.

* * * * *